(12) United States Patent
Hui

(10) Patent No.: US 11,782,720 B2
(45) Date of Patent: Oct. 10, 2023

(54) PROCESSOR ARCHITECTURE WITH MICRO-THREADING CONTROL BY HARDWARE-ACCELERATED KERNEL THREAD

(71) Applicant: Ronald Chi-Chun Hui, Hong Kong (CN)

(72) Inventor: Ronald Chi-Chun Hui, Hong Kong (CN)

( * ) Notice: Subject to any disclaimer, the term of this patent is extended or adjusted under 35 U.S.C. 154(b) by 0 days.

(21) Appl. No.: 17/451,161

(22) Filed: Oct. 18, 2021

(65) Prior Publication Data

US 2022/0156084 A1     May 19, 2022

Related U.S. Application Data

(60) Provisional application No. 63/113,986, filed on Nov. 16, 2020.

(51) Int. Cl.
*G06F 9/38* (2018.01)
*G06F 9/30* (2018.01)

(52) U.S. Cl.
CPC ........ *G06F 9/3851* (2013.01); *G06F 9/30101* (2013.01); *G06F 9/3877* (2013.01)

(58) Field of Classification Search
CPC .. G06F 9/30101; G06F 9/3851; G06F 9/3877; G06F 9/46; G06F 9/4843; G06F 9/4881; G06F 9/526

See application file for complete search history.

(56) References Cited

U.S. PATENT DOCUMENTS

| | | | |
|---|---|---|---|
| 8,037,476 B1* | 10/2011 | Shavit | G06F 9/526 712/228 |
| 8,752,057 B1 | 6/2014 | Gould et al. | |
| 2006/0117316 A1 | 6/2006 | Cismas et al. | |
| 2007/0124728 A1* | 5/2007 | Rosenbluth | G06F 9/526 718/100 |

(Continued)

OTHER PUBLICATIONS

Abellán et al., "GLocks: Efficient Support for Highly-Contended Locks in Many-Core CMPs", 2011 IEEE International Parallel & Distributed Processing Symposium, pp. 893-905.*

(Continued)

*Primary Examiner* — David J. Huisman
(74) *Attorney, Agent, or Firm* — EAGLE IP LIMITED

(57) ABSTRACT

A processor system with micro-threading control by a hardware-accelerated kernel thread and the scheduling methods thereof are provided. The processor system comprises a plurality of processor cores and a mutex processing unit connected with the plurality of processor cores. Each processor core provides a kernel thread and a plurality of user threads for concurrent execution, and each processor core comprises a kernel trigger module configured to monitor a set of trigger conditions and generate a kernel triggering indicator to activate the kernel thread in the processor core. The mutex processing unit is configured to receive a plurality of mutex requests from each processor core, and broadcast a plurality of mutex responses to each processor core. Each of the plurality of mutex requests is configured to create a mutex response that affects an execution status of at least one user thread in the plurality of processor cores.

13 Claims, 9 Drawing Sheets

(56) References Cited

U.S. PATENT DOCUMENTS

| | | | |
|---|---|---|---|
| 2007/0204137 A1* | 8/2007 | Tran | G06F 9/3861 |
| | | | 712/E9.035 |
| 2010/0100889 A1* | 4/2010 | Labrie | G06F 9/526 |
| | | | 718/106 |
| 2017/0046155 A1 | 2/2017 | Adachi et al. | |
| 2019/0317827 A1 | 10/2019 | Kaveri et al. | |
| 2020/0097336 A1* | 3/2020 | France-Pillois | G06F 9/52 |
| 2021/0311773 A1* | 10/2021 | Kogan | G06F 9/526 |

OTHER PUBLICATIONS

"Operating System #27 Hardware Locks: Spinlock & its Usage", Youtube [online] retrieved from Internet <URL: https://www.youtube.com/watch?v=yB8sm-pwvZo> Originally published on Sep. 2, 2017.

\* cited by examiner

PROCESSOR ARCHITECTURE WITH MICRO-THREADING CONTROL BY HARDWARE-ACCELERATED KERNEL THREAD

CROSS REFERENCE TO RELATED APPLICATIONS

This application claims priority to, and the benefit of, U.S. provisional application Ser. No. 63/113,986 filed on 16 Nov. 2020. The entire contents of the foregoing application is hereby incorporated by reference for all purposes.

FIELD OF INVENTION

This invention generally relates to a processor system, and in particular to a processor system with micro-threading control by a hardware-accelerated kernel thread and the thread scheduling methods thereof.

BACKGROUND OF INVENTION

Real time multi-threading is a common feature required by lots of embedded applications, such as communications, finance, automotive, industrial and drone. While a Real-Time Operating Systems (RTOS) can support real-time multi-threading by software, the latency is large due to the non-trivial thread scheduling overhead. The problem is even worse when the architecture scales with multiple cores. While the full hardware implementation can minimize the number of instructions used for thread scheduling, the increased hardware complexity has a negative impact on clock frequency. Moreover, the solution is not scalable as the numbers of hardware threads and processing cores increase. In view of these limitations, the present disclosure presents a unique multi-core architecture which aims to provide a scalability to schedule many threads running in many processor cores.

SUMMARY OF INVENTION

In the light of the foregoing background, a processor system with micro-threading control by a hardware-accelerated kernel thread and the thread scheduling methods thereof are provided.

In one example embodiment, a processor system is provided. The processor system comprises at least one processor core and a mutex processing unit connected with the at least one processor core. Each processor core provides a kernel thread and a plurality of user threads for concurrent execution, and each processor core comprises a kernel trigger module configured to monitor a set of trigger conditions and generate a kernel triggering indicator to activate the kernel thread in the processor core based on the set of trigger conditions. The mutex processing unit is configured to receive a plurality of mutex requests from each processor core, resolve mutex dependencies, and broadcast a plurality of mutex responses to each processor core. Each of the plurality of mutex requests aims to create a mutex response that affect an execution status of at least one user thread in at least one of the processor core, so as to improve thread scheduling efficiency when a processor execution switches from one user thread to another.

In another example embodiment, a method for scheduling kernel threads and user threads in a processor system comprising at least one processor core and a mutex processing unit is provided. The method comprises: receiving, by the mutex processing unit, at least one mutex request originated from a specific user thread in the at least one processor core which requests to affect an execution status of at least one user thread in at least one of the processor cores, wherein each mutex request indicates an identity of the requesting processor core; resolving, by the mutex processing unit, mutex dependencies among the at least one mutex request; generating, by the mutex processing unit, at least one mutex response for the at least one mutex request, wherein the at least one mutex response comprises an identity of the at least one processor core and causes a change in a set of trigger conditions in the at least one processor core, wherein the set of trigger conditions, when satisfied, is to activate a kernel thread in the at least one of the processor cores; broadcasting, by the mutex processing unit, the at least one mutex response to each processor core; determining, by each processor core, if the identity in the broadcasted mutex response matches the identity of its own; in response to the identity in the broadcasted mutex response matching the identity of the requesting processor core, generating, by a kernel trigger module of the requesting processor core, a kernel trigger indicator to activate the kernel thread of the requesting processor core based on the set of trigger conditions; and executing, by the kernel thread of the requesting processor core, a kernel thread program to pass execution control from the specific user thread to another user thread.

In another example embodiment, a method is provided for scheduling a kernel thread and user threads at a processor core in a processor system comprising a mutex processing unit and at least one of the processor core which comprises a kernel trigger module. The method comprises steps of: monitoring, by the kernel trigger module, a set of trigger conditions; generating, by the kernel trigger module, a kernel triggering indicator for the processor core when one of the trigger conditions is satisfied, the kernel triggering indicator specifying a specific user thread to execute in the processor core; activating the kernel thread to run a kernel thread program; and initiating, by the kernel thread program, to execute the specific user thread.

The above example embodiments have benefits and advantages over conventional technology. For example, the provided processor architecture and thread scheduling methods significantly reduce thread scheduling overhead and accelerate thread operations. As a result, this greatly benefits various real-time applications especially for all types of RTOS applications. Meanwhile the scalability of scheduling a considerable amount of threads in multiple processor cores is improved.

BRIEF DESCRIPTION OF FIGURES

Through the following detailed description with reference to the accompanying drawings, the above and other features, advantages and aspects of embodiments of the present invention will become more apparent. In the drawings, identical or similar reference signs represent identical or similar elements, wherein.

DETAILED DESCRIPTION OF THE PREFERRED EMBODIMENTS

Figure 1:
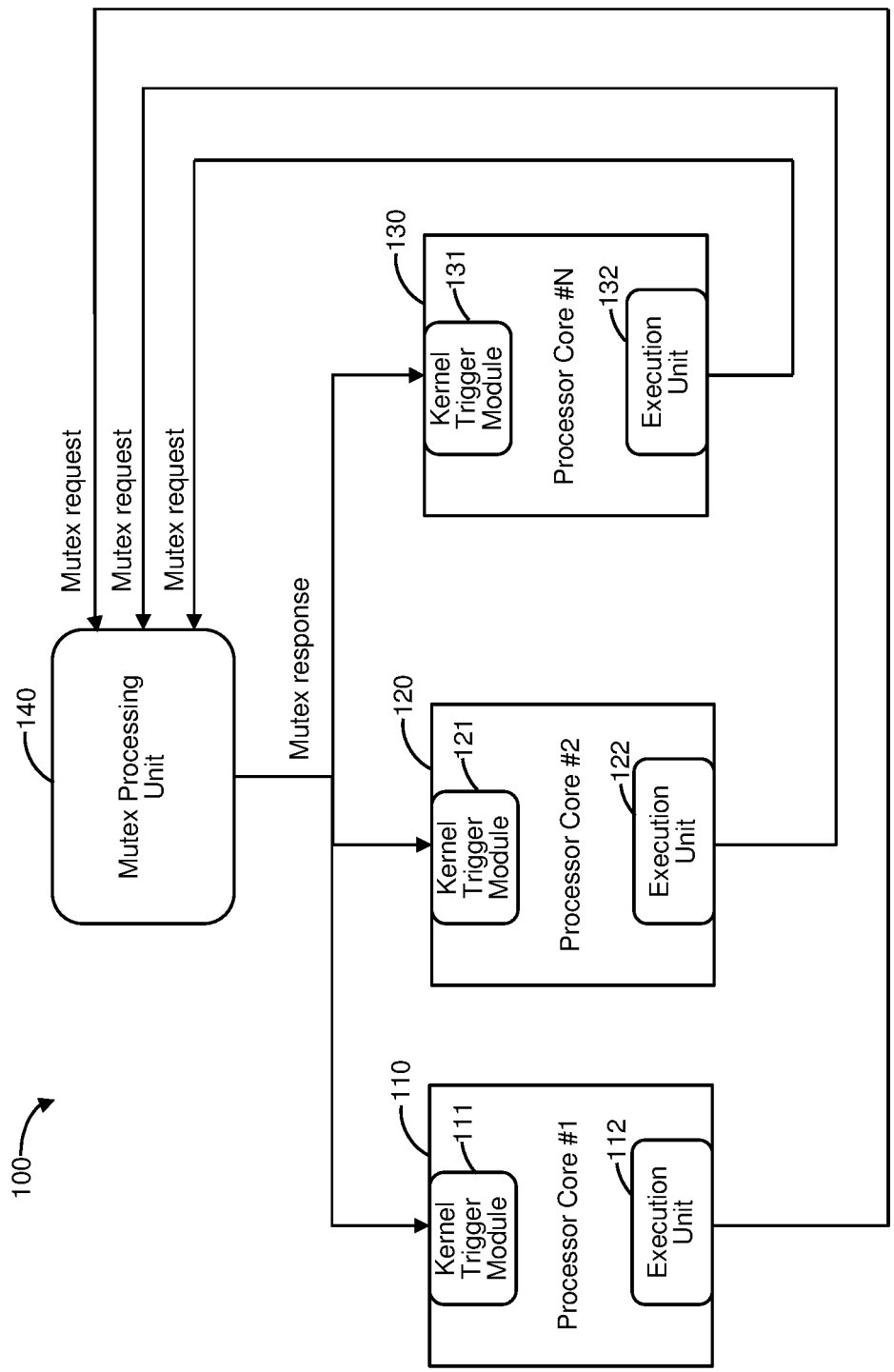
FIG. 1 shows a diagram of a processor system architecture with micro-threading control by hardware-accelerated kernel thread according to embodiments of the present disclosure.

As used herein and in the claims, "comprising" means including the following elements but not excluding others. The term "based on" is to be read as "based at least in part on." The term "one example embodiment" and "an example embodiment" are to be read as "at least one example embodiment." The term "another embodiment" is to be read as "at least one other embodiment."

As used herein and in the claims, "a kernel thread" refers to a type of processing threads which is managed at kernel level, and "a user thread" or "a thread" refers to an entity used by programmers and users to handle multiple flows of controls within a program. The kernel thread can schedule the next user thread. Across the description, "a thread" and "a user thread" may use interchangeably.

As used herein and in the claims, "a mutex lock" or "a mutex" refers to a mechanism that enforces limits or restrictions on access to a resource when there are many threads in execution, where a lock is designed to enforce a mutual exclusion concurrency control policy.

As used herein and in the claims, "a processor core" refers to an individual processing unit (also called a core) in a multi-core processor or a processor system. In some embodiments, the processor cores are RISC (Reduced Instruction Set Computer) cores.

As used herein and in the claims, "logical one" and "logical zero" refer to logical values of the relational and Boolean operators.

As used herein and in the claims, "an execution status of a user thread" refers to the states that a user thread may be performing during its lifecycle, such as runnable, blocked, waiting, timed-waiting, running, terminated, etc. In some embodiments, when a user thread is not in running, it is considered as being inactivated, and when it is started or created, it is considered as being activated.

As used herein and in the claims, "couple" or "connect" refers to electrical coupling or connection either directly or indirectly via one or more electrical means unless otherwise stated. In some embodiments, connections between different components are via wires or bus lines.

The present disclosure presents a unique architecture with hardware accelerated real-time kernel trigger which aims to provide the scalability to schedule many threads running in one or more processor cores with a hardware-software co-design architecture accelerating thread operations. The following example embodiments alone or in combination may be practiced to provide methods and systems for multi-threading in a processor system comprising at least one processor core with the unique architecture according to the present disclosure.

According to a first aspect of the present disclosure, a processor system is provided. In one example embodiment, the processor system comprises: at least one processor core and a mutex processing unit connected with the at least one processor core. Each processor core provides a kernel thread and a plurality of user threads for concurrent execution, and each processor core comprises a kernel trigger module configured to monitor a set of trigger conditions and generate a kernel triggering indicator to activate the kernel thread in the processor core based on the set of trigger conditions. The mutex processing unit is configured to receive a plurality of mutex requests from each processor core, resolve mutex dependencies, and broadcast a plurality of mutex responses to each processor core. Each of the plurality of mutex requests aims to create a mutex response that affect an execution status of at least one user thread in at least one of the processor cores, so as to improve thread scheduling efficiency when a processor execution switches from one user thread to another.

In some embodiments, the kernel thread of an individual processor core in the plurality of processor cores is configured to, after being activated by the kernel triggering indicator, schedule a next user thread in the individual processor core based on (1) priorities of user threads in the individual processor core, (2) the execution status of at least one user thread in the individual processor core and (3) the plurality of mutex responses generated by the mutex processing unit.

In some embodiments, the trigger conditions comprise one of the following conditions: a time period allocated to a currently running user thread expires; a user thread having higher priority than the currently running user thread appears; and the currently running user thread becomes inactivated.

In some embodiments, each of the plurality of processor cores further comprises: a thread request register, a plurality of priority registers and a mutex register. The thread request register comprises a plurality of bits and each bit is configured to hold a status of each user thread in each of the plurality of processor cores. A mutex register comprises a same number of bits as the thread request register and each bit is configured to hold a status associated with a mutex lock or a conditional variable for each user thread. The plurality of priority registers, each of the plurality of priority registers comprising the same number of bits as the thread request register and each bit is configured to hold a priority of each user thread, wherein a designated bit position in the thread request register corresponds to a specific user thread and is set to logical one if the specific user thread is to be activated and otherwise is set to logical zero; an identical designated bit position in the mutex register corresponds to the specific user thread and is set to logical one if the specific user thread is to be activated and otherwise is set to logical zero; and bit values in the identical designated bit positions of the plurality of priority registers encode a priority value of the specific user thread.

In some embodiments, each priority register corresponds to a specific priority and is set to logical one if this user thread is assigned to a priority identical to the specific priority in the corresponding priority register and otherwise is set to logical zero. Each processor core further comprises a status evaluation module comprising a plurality of logic gates, a thread selector and a priority detector. The plurality of logic gates is configured to operate on bitwise basis of the thread request register, the plurality of priority registers and the mutex register to output (i) a first group of bitwise AND values, wherein the first group further comprises a plurality of subgroups, and each subgroup corresponds to bitwise AND operation on the $i^{th}$ bit in the thread request register, the $i^{th}$ bit in the mutex register and the $i^{th}$ bit in one specific priority register where the $i^{th}$ bit corresponds to the $i^{th}$ user thread in the processor core, and (ii) a second group of OR values wherein each input to the OR operation corresponds to one subgroup of the bitwise AND values. The thread selector is configured to receive the first group of the bitwise AND values and output a first signal indicating whether a currently running user thread is inactivated. The priority detector is configured to receive the second group of the OR values and output a second signal indicating whether there is a runnable user thread having a higher priority than the currently running user thread.

In some embodiments, the status evaluation module comprises a plurality of logic gates configured to operate on bitwise basis of the thread request register, the plurality of priority registers and the mutex register to output (i) a first group of bitwise AND values, wherein the first group further comprises a plurality of subgroups, and each subgroup corresponds to bitwise AND operations on the $i^{th}$ bit in the thread request register, the $i^{th}$ bit in the mutex register and the $i^{th}$ bit from a decoder yielding the specific priority from the encoded priority bit values where the $i^{th}$ bit corresponds to the $i^{th}$ user thread in the processor core, and (ii) a second group of OR values wherein each input to the OR operation corresponds to one subgroup of the bitwise AND values; a thread selector configured to receive the first group of the bitwise AND values and output a first signal indicating whether a currently running user thread is inactivated; and a priority detector configured to receive the second group of the OR values and output a second signal indicating whether there is a runnable user thread having a higher priority than the currently running user thread.

In some embodiments, the kernel trigger module of each processor core is further configured to receive outputs of interrupts, exception and buffer count status from peripheral controllers, an internal DMA, a trace buffer, an application-specific hardware accelerator by corresponding bits of the thread request register.

In some embodiments, the mutex processing unit comprises a request arbiter, an exclusive memory and a coprocessor controller. The request arbiter has a plurality of interfaces connecting with the at least one processor core and is configured to receive the plurality of mutex requests from the at least one processor core and determine which mutex requests to process. The exclusive memory is for storing data required for acquiring or releasing mutex locks, and waiting, signaling, and broadcasting of conditional variables. The coprocessor controller is configured to coordinate with the request arbiter to process the plurality of mutex requests by accessing the exclusive memory and resolving mutex dependencies and to generate the plurality of mutex responses based on request types of the plurality of mutex requests. The coprocessor controller can either be a dedicated hardware module or a processor core with customized instructions which expedite mutex coprocessing.

In some embodiments, the exclusive memory comprises a lock-status table, at least one blocked request queue per mutex and multiple conditional signaling queues. The lock-status table includes a first array storing information indicating a lock status of each mutex lock, a second array storing an identity of the processor core requesting a mutex lock and a third array storing an identity of the user thread requesting a mutex lock. Elements in the first array, the second array and the third array are associated with an index of each mutex lock. The at least one blocked request queue queues those of the plurality of mutex requests that are blocked. Each of the multiple conditional signaling queues is associated with a conditional variable and stores the identity of at least one user thread waiting for a condition associated with this conditional variable to be met.

In some embodiments, each of the plurality of mutex requests comprises at least one of the following: an identity of requesting processor core, an identity of destined processor core, a requesting type, an identity of a requesting thread, an index of a target mutex lock, and an index of a conditional variable that the requesting thread requires.

In some embodiments, the plurality of mutex requests may comprise conditional variable related requests for processing a conditional variable which is located in a shared data area guarded by a mutex lock. The conditional variable related requests comprise one of the following requesting types: a request to wait for the signaling of said conditional variable; a request to wake up a specific user thread associated with said conditional variable in a particular processor core; and a request to broadcast to all processor cores to wake up those threads that are waiting for said conditional variable.

In some embodiments, the plurality of mutex requests may comprises one of the following requesting types: a request to activate a particular thread; a request to terminate a particular thread; a request for a target lock to be locked; and a request for a target lock to be unlocked.

In some embodiments, each of the plurality of mutex responses comprises at least one of the following: an identity of the requesting processor core, a response type, an identity of the requesting thread; and an indication of processor core being served by the mutex processing unit. The response type includes information indicating any of the following: a particular thread to be activated; a particular thread to be terminated; a conditional variable is ready to access; a request for acquiring a target lock is granted; a request for unlocking a target lock is granted; a request for a target lock to be unlocked is invalid; and exception error. In one embodiment, the exceptions are events that disrupt the normal flow of program execution, such as when a FIFO (First In First Out) queue overflows.

In some embodiments, some of the plurality of mutex responses comprise signals to wake up any one of the pending threads associated with a particular conditional variable, or a signal to wake up all pending threads associated with a particular conditional variable.

In some embodiments, the mutex processing unit comprises a mutex cache and a request arbiter. The mutex cache is for storing data required for acquiring or releasing mutex locks, and waiting, signaling and broadcasting of conditional variables. The request arbiter has a plurality of interfaces connecting with the plurality of processor cores and is configured to arbitrate on whether to process one or more of the plurality of mutex requests upon receiving them and generate at least one of the mutex responses obtained from a mutex request generator. One and only one thread running in one processor core is granted an exclusive right to access the mutex cache at any given time.

In some embodiments, each of the at least one processor core comprises a unified cache access interface that enables the processor core to access its local data cache and the mutex cache as a unified cache. The unified cache access interface comprises a mutex request generator configured to generate one of the plurality of mutex requests; a mutex response decoder configured to receive the plurality of mutex responses comprising either an exclusive access response or a read-data response wherein the exclusive access response updates an exclusive access status for the processor core to access the mutex cache exclusively and the read-data response forwards the data received from the mutex cache to the processor core; a read-data multiplexer connected with the mutex response decoder and configured to output read-data either from the local data cache or from the mutex cache forwarded by the mutex response decoder to a read-data port of the processor core; and a request demultiplexer connected with the mutex request generator and configured to determine whether to forward a load/store request of the processor core either to the local data cache or to the mutex request generator so as to access the mutex cache via a unified cache access interface.

In some embodiments, the unified cache access interface further comprises an exclusive access monitor configured to monitor the exclusive access status of the processor core and provide the exclusive access status to the processor core to facilitate generation of the exclusive requests.

In some embodiments, the plurality of exclusive requests comprises one of the following: a request to acquire exclusive right to access the mutex cache; a request to release the exclusive right; a request to read the mutex cache; a request to write the mutex cache; and a request to write kernel trigger registers in any processor core causing a change in the trigger conditions in the processor core. Each of the plurality of special mutex responses comprise one of the following: a grant of requested exclusive right; and a return of read-data of the mutex cache.

In some embodiments, each of the plurality of processor cores further comprises a context switching module and a multi-page register storage. The multi-page register storage comprises a plurality of register groups, each register group comprises a plurality of register pages, and each register page comprises a plurality of registers; and the context switching module is configured to switch register context by changing the register page pointer if a requested page is cached, so that a context switching overhead can be reduced. Each user thread in the plurality of processor cores is associated with only one page of one of the plurality of register groups at any given time.

In some embodiments, each processor core further comprises a first control register for indicating which storage page is currently being accessed and a second control register for indicating which storage group is currently being accessed, and a storage array recording each thread index associated with a register page and a register group.

In some embodiments, special executable instructions are provided to each processor core for thread control by modifying the kernel trigger registers, including instructions to enable or disable a new user thread in any processor core, to define a thread priority for a user thread in any processor core, to request a mutex lock and to control conditional variables.

According to another aspect of the present disclosure, a method for scheduling kernel threads and user threads in a processor system comprising at least one processor core and a mutex processing unit is provided. The method comprises: receiving, by the mutex processing unit, at least one mutex request originated from a specific user thread in the at least one processor core which requests to affect an execution status of at least one user thread in any of the at least one processor core, wherein each mutex request indicates an identity of the requesting processor core; resolving, by the mutex processing unit, mutex dependencies among the at least one mutex request; generating, by the mutex processing unit, at least one mutex response for the at least one mutex request, wherein the at least one mutex response comprises an identity of the at least one processor core and causes a change in a set of trigger conditions in the at least one of the plurality of processor cores, wherein the set of trigger conditions, when satisfied, is to activate a kernel thread in the at least one processor core; broadcasting, by the mutex processing unit, the at least one mutex response to each processor core; determining, by each processor core, if the identity in the broadcasted mutex response matches the identity of its own; in response to the identity in the broadcasted mutex response matching the identity of the requesting processor core, generating, by a kernel trigger module of the requesting processor core, a kernel trigger indicator to activate the kernel thread of the requesting processor core based on the set of trigger conditions; and executing, by the kernel thread of the requesting processor core, a kernel thread program to pass execution control from the specific user thread to another user thread.

In some embodiments, the resolving step further comprising: selecting, by a request arbiter inside the mutex processing unit, whether to process one or more of the plurality of mutex requests; determining one of the following in response to each such mutex requests: in response to a mutex request for a mutex lock being rejected, appending this mutex request to a blocked request queue in an exclusive memory in the mutex processing unit; in response to a mutex request for a mutex lock being granted, generating the at least one mutex response indicating a grant status of the mutex lock; and in response to a mutex request waiting for a signaling of a conditional variable, appending this mutex request to a conditional signaling queue in the exclusive memory.

According to further another aspect of the present disclosure, a method is provided for activation a kernel thread to schedule user threads at a processor core in a processor system comprising a mutex processing unit and at least one processor core which comprises a kernel trigger module. The method comprises steps of: monitoring, by the kernel trigger module, a set of trigger conditions; generating, by the kernel trigger module, a kernel triggering indicator for the processor core when one of the trigger conditions is satisfied, wherein the kernel triggering indicator specifies a specific user thread to execute in the processor core; activating the kernel thread to run a kernel thread program; and initiating, by the kernel thread program, to execute the specific user thread.

In some embodiments, the monitoring step further comprises: collecting a group of indicators from a plurality of peripheral hardware events, a first indicator from the mutex processing unit in response to a mutex request from the at least one processor core, and a second indicator generated from executing a software instruction in an execution unit of the processor core, these indicators being stored in the kernel trigger module and forming the set of trigger conditions.

In some embodiments, the initiating step further comprises: identifying runnable user threads in the processor core; prioritizing the runnable user threads; and selecting a runnable user thread with highest priority to proceed.

In some embodiments, the processor system comprises a plurality of processor cores and the method further comprises: generating, by an execution unit in one of the processor cores, a mutex request that affects thread scheduling in at least one of the plurality of processor cores; and sending the mutex request to the mutex processing unit, so that the mutex processing unit can broadcast, to the plurality of the processor cores, a corresponding response that causes a change in the set of trigger conditions in the at least one of the plurality of processor cores.

In some embodiments, the step of monitoring further comprises monitoring one of the following conditions: a time period allocated to a currently running user thread expires; a user thread having higher priority than the currently running user thread appears; and the currently running user thread becomes inactivated.

In some embodiments, the mutex processing unit comprises a mutex cache for storing data required for acquiring or releasing mutex locks, and waiting, signaling and broadcasting of conditional variables, and the method further comprises: generating a mutex request for acquiring an exclusive right to access the mutex cache to the mutex processing unit; and in response to a grant of acquiring the exclusive right from the mutex processing unit, performing writing and reading operations on the mutex cache.

In some embodiments, the step of performing writing and reading operations on the mutex cache comprises: receiving a plurality of mutex responses from the mutex processing unit; for each of the plurality of mutex responses, determining whether the received mutex response is a read-data response or an exclusive access response; in response to the read-data response, forwarding the read-data to a read-data port; in response to the exclusive access response, updating an exclusive access status of the processor core.

In some embodiments, the step of performing writing and reading operations on the mutex cache further comprises: executing a load and store instruction by an execution unit in the processor core, wherein the load and store instruction comprises either a read request with data address or a write request with data address and write data; determining whether the data address in the load and store request falls within an address range of the mutex cache; and in response to the data address falling within the address range of the mutex cache and the exclusive access status of the processor core being granted, generating the mutex request for performing writing and reading operations on the mutex cache.

Processor System Architecture

Referring now to FIG. 1, FIG. 1 shows a diagram 100 of a processor system architecture with micro-threading control by hardware-accelerated kernel thread. In the processor system architecture according to embodiments of the present disclosure, the multi-core processor comprises at least one processor core, such as processor core #1 110, processor core #2 120 and processor core #N 130, and a mutex processing unit 140. Each processor core has a kernel trigger module indicated as 111, 121 and 131 and an execution unit indicated as 112, 122 and 132.

It would be appreciated that though some figures for the embodiments of present disclosure show several processor cores in a processor system, the present disclosure are applicable to a processor system comprising any number of processor cores, i.e., one or more processor cores.

Each processor core provides a kernel thread and a plurality of user threads for concurrent execution. Each kernel trigger module is configured to monitor a set of trigger conditions and generate a kernel triggering indicator to activate the kernel thread in this processor core based on the set of trigger conditions. These trigger conditions may be associated with different sources, including processer core executing specially designed instructions, a thread timer that counts how many more cycles that a newly scheduled thread can continue to run, and various indicator obtained from the mutex processing unit 140, from all types of peripherals, and from different exception conditions, etc. If the kernel triggering indicator is activated for example being set to '1', a processor Program Counter (PC) at the next cycle is set as the kernel thread PC to run the kernel thread, which will in turn schedule the next activated user thread among multiple pending user threads with different priorities.

Each execution unit in a processor core, when executing thread instructions, may generate a mutex request aiming to create a mutex response that affect an execution status of at least one user thread in one or more of the plurality of processor cores. The mutex processing unit 140 is connected with the plurality of processor cores and configured to receive a plurality of mutex requests from each of the plurality of processor cores and provide corresponding mutex responses.

To this end, in some embodiments, each processor core has integrated new instructions, i.e., micro-thread instructions extension, for thread control such as enabling or disabling a new thread in any core, for defining the thread priority, scheduling threads, requesting mutex and controlling conditional variables.

The mutex processing unit 140, upon receiving the mutex request, determines when and how to respond and generates a corresponding mutex response, and then broadcasts the mutex response to the processor cores. Consequently, the plurality of mutex responses cause a change in the trigger conditions in at least one of the plurality of processor cores. The mutex response may cause the kernel trigger module of the requesting processor core or that of other processor core(s) to generate the kernel trigger indicator, and in turn causes the corresponding processor core(s) to execute the kernel thread and schedule user threads.

In some embodiments, while there may be mutex requests simultaneously sent from multiple processor cores, the mutex processing unit 140 buffers and arbitrates the incoming requests and processes them one by one in serial, thus avoiding racing conditions. It resolves mutex dependencies and maintains the conditional variable while meeting the atomicity constraints. Moreover, it queues those mutex requests which fail to acquire a mutex lock and automatically retries them later until the mutex lock is released.

According to embodiments of the present disclosure, the thread management functions include creating threads, pausing threads, scheduling threads, setting thread priority, acquiring/releasing mutex locks and monitoring conditional variables, . . . etc. A processor core not only can control a thread running by itself, but also any thread running in another processor core. In order to leverage the micro-thread features with high performance, as mentioned above, each processor core incorporates a number of extended instructions which can read and write the internal registers in the kernel trigger modules of different cores. Furthermore, each processor core can execute instructions to communicate with the mutex processing unit to send mutex and conditional variable requests. As a result, there is no need to run any software to get the responses from the mutex processing unit since the mutex processing unit modifies or activates the kernel thread registers of the target core directly.

The processor core executes either a kernel thread or a user thread at any given time. The kernel thread has the highest privilege and so it can access all registers and hardware resources. If the kernel trigger module detects a trigger condition, the current user thread is paused immediately and the next PC value of the current thread is saved. The kernel trigger then sets the next PC to the first instruction of the kernel thread program in order to activate the kernel thread. Then the processor core executes the kernel thread to perform at least one of the following tasks which will be discussed in detail:

scheduling the next user thread to be executed such that the next thread has the highest priority among all eligible threads. If there are multiple eligible threads with the same highest priority, either a round-robin algorithm or weighted round robin algorithm is used to select one of the threads.

performing context switching by either changing the register page pointer or swapping the register content with the memory content. In case of swapping, the processor saves the least recently used (LRU) page to the system memory and then overwrite the LUR page with the register page of the next thread retrieved from the memory.

setting a timer for the next thread. When the thread timer finishes counting, it will trigger the kernel thread and the current thread is interrupted. The timer prevents a thread from occupying the hardware for a long time and making other threads not responsive.

activating the scheduled thread.

According to embodiments of the present disclosure which will be discussed in detail below, at least three options to implement the mutex coprocessing are provided. At the mutex processing unit, an exclusive memory is configured to store data required for acquiring or releasing mutex locks, and waiting, signaling, and broadcasting of conditional variables. The exclusive memory may include all types of data structures such as FIFO queues, arrays, tables, etc.

The first option is to use a fixed function hardware accelerator together with the exclusive memory and request/response interface(s).

The second option is to use a dedicated processor core (such as a RISC core) together with the exclusive memory and request/response interface(s), where the processor core has customized instructions to speed up processing, such as those for expedite processing of the FIFO queues of blocking mutex and conditional variables.

The third option is to use the exclusive memory and request/response interface(s) in addition to a unified cache interface in each processor core, where the mutex processing workload is distributed among the processor cores which are also running the user threads.

This unique hardware-software codesign multi-core architecture, provides the scalability to schedule many threads running in many processor cores as it accelerates thread switching operations.

Processor Core

Figure 2:
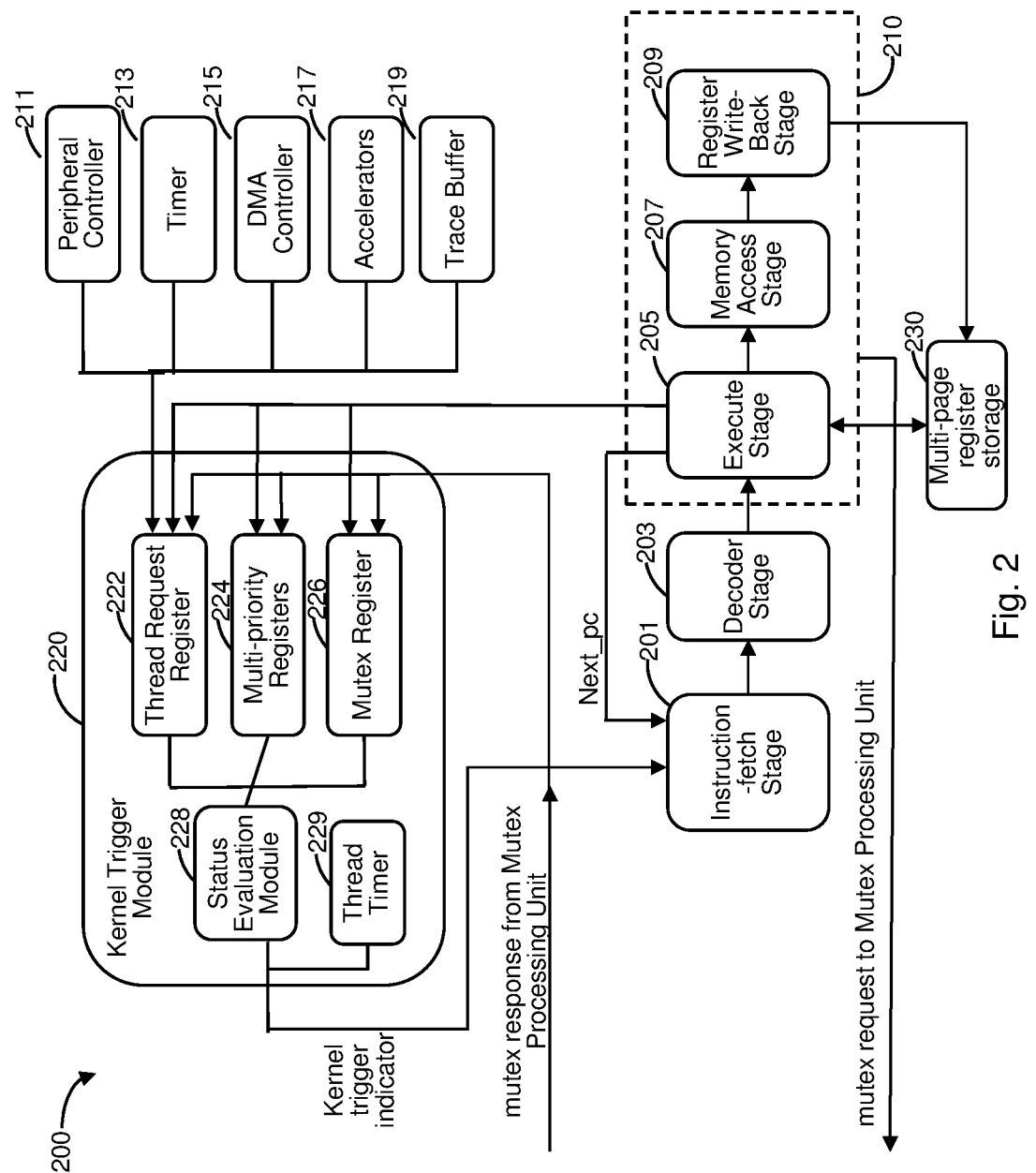
FIG. 2 shows a diagram of a processor core in the processor system architecture of FIG. 1 according to some embodiments of the present disclosure.

FIG. 2 shows a diagram of a processor core 200 in the processor system architecture of FIG. 1 according to some embodiments of the present disclosure. As shown, the processor core 200 with hardware multithreading consists of some common components of a processor, such as a processor pipeline comprising of an instruction-fetch stage 201, a decoder stage 203, an execute stage 205, a memory access stage 207 and a register write-back stage 209, and some hardware modules such as a peripheral controller 211, a timer 213, a Direct Memory Access (DMA) controller 215, accelerators 217 and a trace buffer 219. It would be appreciated that some other common components in a processor, such as I-cache and D-cache, are not shown in order not to obscure the description of the embodiments of the present disclosure.

In some embodiments, one or more of the execute stage 205 and the memory access stage 207 209 may function as an execution unit 210 similar as the execution unit 112, 122 or 132 in FIG. 1.

In some embodiments of the present disclosure, the processor core 200 additionally contains a number of unique hardware modules, including a kernel trigger module 220, a multi-page register storage 230, and multiple new processor instructions for controlling threads, mutexes and conditional variables in different processor cores.

Considering that context switching is the biggest overhead in thread scheduling, in some embodiments the multi-page register storage 230 is integrated in the processor core 200 such that it may switch register context by changing the register page pointer, instead of copying values between the register file and the system memory if the requested page is not cached. In this way, context switching overhead can be significantly reduced if the required register page is already cached. Since the number of threads is larger than the number of register pages, a cache-like Least Recently Used (LRU) algorithm is used to select which page to flush if the request page is not cached. Details will be discussed later.

The kernel trigger module 220 is a hardware module continuously monitoring the trigger conditions for the processor core 200. It includes multiple kernel trigger registers to hold information of execution status for each user thread managed by the processor core 200. In one embodiment, the kernel trigger module 220 has three types of special-purpose thread registers to keep track of the trigger conditions, namely, a thread request register 222, multi-priority registers 224 and a mutex register 226. Additionally, the kernel trigger module 220 has a status evaluation module 228 which operates on the three special-purpose thread registers on bitwise basis.

The plurality of priority registers is configured to hold a priority of each user thread. A position of each bit in each priority register corresponds to one user thread, and a combination of bit values in the same bit position among the plurality of priority registers encodes a specific priority.

Suppose T is the maximum number of user threads in the processor core 200 and P is the number of supported priorities for user threads. Each individual bit of the thread request register 222, the multi-priority registers 224, and the mutex register 226 are denoted as request_mask[t], priority_mask[p][t], and mutex_mask[t] respectively, where $0<=p<P$ and $0<=t<T$. Since each user thread t is only assigned one priority, there exists at most one p* only such that priority_mask[p*][t]=1 while other priority_mask[p][t] =0 for all p not equal to p*.

In one embodiment, the various thread register bits are set to '1' according to the following criteria:

for the thread request register 222: the $t^{th}$ bit is '1' if the $t^{th}$ thread is activated and '0' otherwise;

for the multi-priority registers 224: if a user thread t* is assigned a priority p*, then priority_mask[p*][t*]=1;

for the mutex register 226: the $t^{th}$ bit is '0' if the $t^{th}$ thread has requested a mutex lock M* but M* is not available yet; it takes on the value '1' if there is no mutex request or the requested mutex lock M* is granted by the mutex processing unit. The mutex register is also shared with conditional signaling. If a user thread is waiting for a conditional signal, the corresponding bit is set to '0' and it will be set to '1' later by the mutex processing unit.

In another embodiment, suppose $X=\log_2 P^{\#}$ where $P^{\#}$ is the least value greater than the number P of supported priorities for user threads that satisfies $X=\log_2 P^{\#}$. The multi-priority registers may consist of X registers and corresponding bits in the X registers represent a priority for a specific user thread. If a user thread t* is assigned a priority p*, then priority_mask[$X_0$, $X_1$, ... $X_{X-1}$][t*]=p*, where $X_0$, $X_1$, ... $X_{X-1}$ takes on values of logic zero or logic one. Specifically, let X=3 and P=P# and in order to specify a priority p*=3, the bit pattern in the priority_mask is priority_mask[011][t*]=3.

It would be appreciated that those special-purpose thread registers are provided to hold status information related with each user thread that may affect its execution status. The above implementations are only described as examples.

The thread request register 222 is updated by various software and hardware modules. In one embodiment, if a hardware module associated with the $i^{th}$ request bit detects an interrupt or external event, it will set the request bit of the $i^{th}$ thread to '1'. If the trigger source comes from software, an arbitrary bit can be set to '1' or '0'. The following shows how a thread request is generated in 3 cases:
- A software instruction can enable or disable a certain user thread by modifying a bit of the thread request register 222 corresponding to the user thread;
- Exceptions or specific events generated from different internal hardware modules, such as the DMA controller 215, hardware accelerators 217, and the trace buffer 219, etc., may modify a bit of the thread request register 222. The kernel thread will schedule an appropriate subroutine to handle the corresponding event or exceptions;
- Peripheral controller for such as GPIO, IO FIFO, UART debug port, etc., may modify a bit of the thread request register 222 corresponding to the input interrupts or the event that the peripheral FIFO counter meeting certain counter conditions so that the kernel thread will schedule a corresponding interrupt subroutine. The counter condition may be input-FIFO counter larger than a threshold so that a peripheral subroutine is triggered to copy data from input FIFO memory to system memory to avoid buffer overflow. It may also be output-FIFO counter smaller than a threshold so that a peripheral subroutine is triggered to copy data from system memory to the output FIFO memory to avoid buffer underflow.

The multi-priority registers 224 may be updated by various software. In some cases when setting a bit in the thread request register 222, a corresponding bit in one of the multi-priority register 224 is required to be set. The priorities of the hardware modules and peripherals are programmable by users depending on requirements of applications. In general, real-time applications have higher priorities than non-real-time applications.

According to some embodiments of the present disclosure, each processor core or interrupt hardware may modify or cause to modify the special-purpose thread registers in any kernel trigger module of any processor cores by, for example, sending mutex requests to the mutex processing unit and receiving the mutex responses from the mutex processing unit. In an exemplary embodiment, the execution unit 210 may generate and send a mutex request to the mutex processing unit 140, requesting for a mutex lock for a user thread managed by the processor core 200, or for causing a change in the running status of a user thread in another processor core. On the other hand, the mutex responses from the mutex processing unit 140 affect the values of the three registers 222, 224 and 226.

In one embodiment, if multiple sources are requesting to modify different bits of these registers 222, 224 and 226 simultaneously, the processor core 200 may only serve one of them in each clock cycle. Those which fail the contention need to continue to request access to the desired register until each request is served.

As mentioned above, the kernel trigger module 220 is configured to monitor a set of trigger conditions and generate a kernel triggering indicator to activate the kernel thread in this processor core 200 based on the set of trigger conditions. According to one embodiment, the kernel trigger module 220 also maintains a thread timer 229, which monitors the number of clock cycles consumed by a current user thread.

In this embodiment, the activation of the kernel thread by the kernel trigger module 220 depends on the thread timer 229 and the bitwise AND values of the three special thread registers. Upon triggering, the kernel thread will only consider a thread t during scheduling if the bitwise AND value of that thread t, i.e., priority_mask[p*][t] AND request_mask[t] AND mutex_mask[t] equals '1'.

Suppose the currently executed thread is denoted as curTh and the thread priority of the current thread is denoted as curP. According to some embodiments, if either one of the following three trigger conditions is true, the kernel trigger module 220 will output a kernel trigger indicator to activate the kernel thread in the processor core 200.
- the currently running user thread, i.e. curTh, becomes inactivated;
- a user thread having a higher priority than that of the currently running user thread, i.e. curP, becomes runnable; and
- a time period allocated to a currently running user thread expires.

First trigger condition: The current running thread is paused/killed. It implies that the AND results of the three mask register bits of the current thread changes from '1' to '0'. In other words, priority_mask[curP][curTh] AND request_mask[curTh] AND mutex_mask[curTh] equals '0'. Since the processor core 200 is idle after stopping the current thread, the kernel thread needs to schedule a new user thread.

Second trigger condition: If there is any change in some bits of the three special thread registers, causing at least one of the higher-priority threads to be eligible for scheduling, the kernel trigger module 220 needs to interrupt the currently running user thread to schedule the higher priority thread. In one embodiment, the kernel trigger module 220 detects whether any higher-priority user thread becomes eligible for scheduling, i.e. high_priority_trigger=1, using the following pseudo code.

high_priority_trigger=0
for(p=0; p<curP; p++)
  for(t=0; t<T; t++)
    if(request[t]==1 && priority_enable[p][t]==1 && mutex_mask[t]==1)
      high_priority_trigger=1; break;

Third trigger condition: The thread timer 229 in the kernel trigger module 220 counts how many more cycles that the newly scheduled thread can continue to run. When the kernel thread schedules a new user thread, the timer counter is set with some user defined value. The timer counter decreases by '1' when an instruction is executed or at every cycle. In some case, it is desirable the timer counter should depend on the absolute cycle count so that even if the process stall due to cache miss or waiting for peripheral data, it can still ensure to meet the worst-case latency requirement of some strictly real-time applications like machine control. When the thread timer becomes zero, it will automatically generate a trigger signal to activate the kernel thread immediately. The thread switching overhead can be quite large. A larger counter of a thread timer can increase the execution efficiency since the switching overhead can be amortized by long execution intervals. However, it is also necessary to limit the maximum interval to avoid a thread with a large timer from stalling the services for other threads within a particular time interval, which will be undesirable for real-time applications. It should be noted that the thread timer indicates the maximum time slice to be used by a thread. The actual time may be shorter if a higher-priority thread interrupts the current thread, or the current thread finishes execution before the thread timer event occurs.

Once the kernel thread is activated by the kernel triggering indicator, a program counter at a next clock cycle is set as a program counter of the first instruction of the kernel thread. The kernel thread then performs priority-based scheduling to select the next user thread. In some embodiments, the kernel thread in each processor core is configured to, after being activated by the kernel triggering indicator, schedule a next user thread based on (1) priorities of user threads in the processor core, (2) the execution status of the user threads and (3) the plurality of mutex responses for the user threads.

The eligible thread with the highest-priority will be evaluated first before considering other lower-priority eligible threads. If there are multiple eligible threads with the same highest priority, the processor core employs an arbitration algorithm, such as the round-robin algorithm or weighted round robin algorithm, to select one of the user threads.

Figure 3:
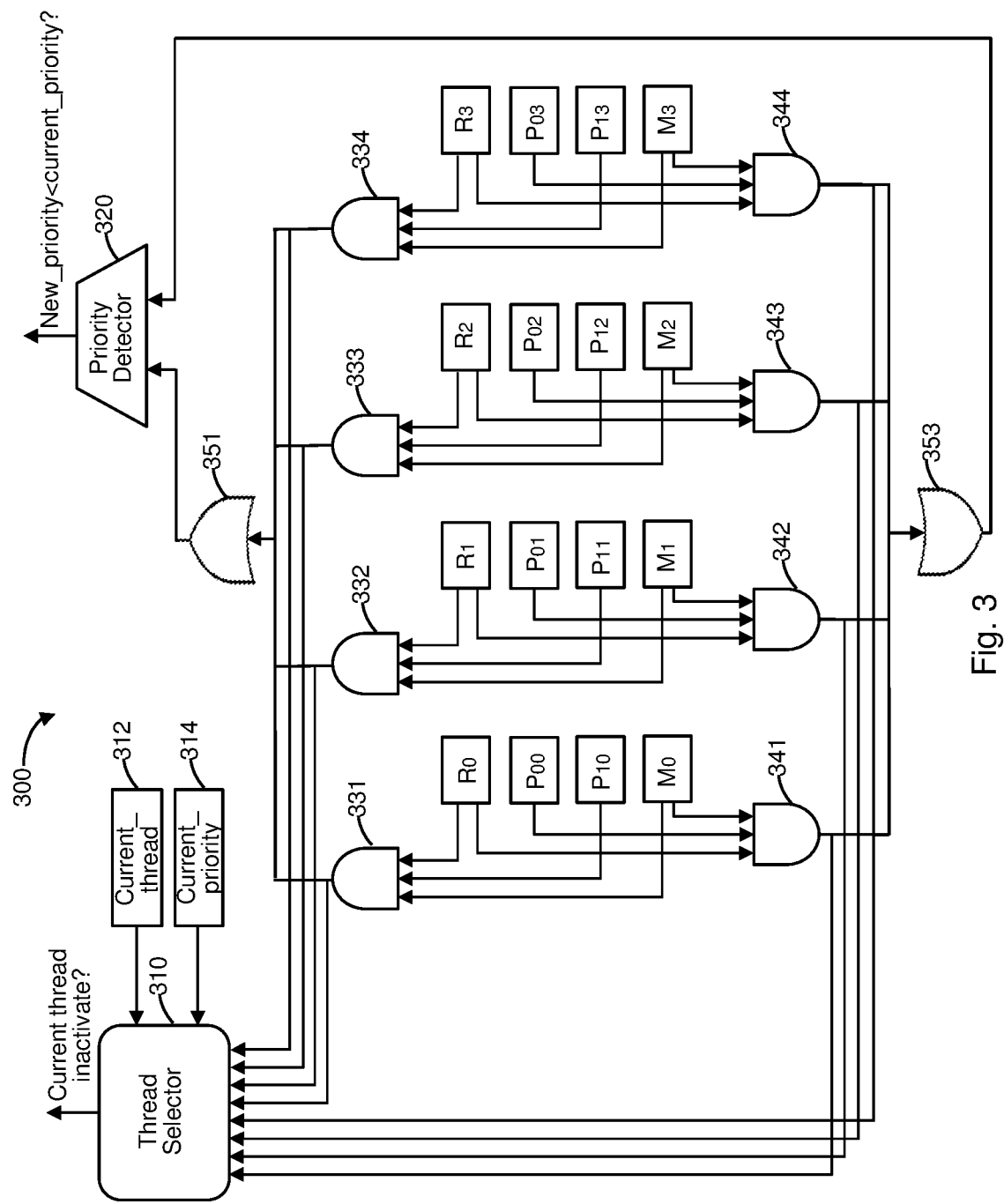
FIG. 3 shows a diagram of an exemplary implementation of a status evaluation module in a kernel trigger module according to some embodiments of the present disclosure.

The following pseudo code shows one of the embodiments of arbitrating the highest-priority thread, i.e. Nxt_thread, in a round robin way, where 'rrptr' is the round robin pointer.

for(p=0; p<P; p++) //scanning from the highest priority to lowest priority
  for(t=0; t<T; t++)
    t2=(t+rrptr)%T
    if(request_mask[t2]==1&&priority_enable[p][t2]==1&&mutex_mask[t2]==1)
      Nxt_thread=t2; rrptr=(t2+1)% T; break;

FIG. 3 shows a diagram 300 of an exemplary implementation of a status evaluation module in a kernel trigger module according to some embodiments of the present disclosure. As shown, the status evaluation module has a plurality of logic gates configured to operate on a bitwise basis on the thread request register, the multi-priority registers and the mutex register. The status evaluation module also has a thread selector 310 and a priority detector 320.

In this exemplary embodiment, four user threads $t_0$-$t_3$ in a processor core and two priorities assigned to user threads are discussed as an example. That is to say, the thread request register has four bits corresponding to the four user threads $t_0$-$t_3$, namely $R_0$-$R_3$. Each thread also has corresponding multi-priority bits $P_{0t}$ and $P_{1t}$ in the multi-priority register and a mutex bit $M_0$-$M_3$ in the mutex register as shown in FIG. 3.

The status evaluation module include for example AND gates 331-334 and 341-344 as well as OR gates 351 and 353. These logic gates output
(i) a first group of bitwise AND values from AND gates 331-334 and from AND gates 341-344. In other words, the first group of bitwise AND values may further comprise a plurality of subgroups and each subgroup of bitwise AND values corresponds to all the user threads in this processor core with one specific priority; and
(ii) a second group of OR values from OR gates 351 and 353. In other words, each of the OR values is an output OR value for each subgroup of the bitwise AND values and corresponds to one subgroup of the bitwise AND values.

The thread selector 310 is configured to receive the first group of the bitwise AND values and to output a first signal indicating whether a currently running user thread is inactivated. In one embodiment, the information about the identification of current thread and its priority may be in a current thread register 312 and a current-priority register 314, in order for the thread selector 310 to select an activate signal based on the 'current_thread' register 312 and the 'current_priority' register 314. If the selected activate signal becomes '0', the first trigger condition discussed above will trigger a generation of the kernel trigger indicator.

The priority detector 320 is configured to receive the second group of the OR values and output a second signal indicating whether there is a runnable user thread having a higher priority than the currently running user thread. As shown, the priority decoder 320 receives the thread activate signal of different priorities and then selects the highest activated priority. If the new priority has higher priority than the current priority, the second trigger condition discussed above will trigger a generation of the kernel trigger indicator.

As described above in connection with FIG. 2, in one embodiment, the output of the thread selector 310 and the output of the priority detector 320 forms the output of the status evaluation module 228. Together with the kernel timer 229, they establish the complete trigger conditions and in turn determine whether a kernel trigger indicator will be generated to activate a kernel thread in a process core.

In some other embodiments where the multi-priority registers are implemented in different ways, the hardware structures of the status evaluation module in a kernel trigger module may be adjusted accordingly. For example, in the case that the multi-priority registers consist of X registers, where $X=\log_2 P^\#$ and $P^\#$ is the least value greater than the number P of supported priorities for user threads that satisfies $X=\log_2 P^\#$. Each bit in the $x^{th}$ register corresponds to a specific user thread t, and corresponding bits in the X registers together can encode a priority of the user thread t. In one embodiment, X number of registers can encode $2^X$ number of priorities. The status evaluation module may additionally include a decoder to recover the specific priority value from the encoded bit pattern for each bit position of the X registers. The inputs of the decoder are bits of the X registers and output of the decoder are priorities 0 to $P^\#$.

It would be appreciated that the above implementations of the status evaluation module in a kernel trigger module are only described as examples. The hardware design may be practiced with variation of these specific details, and that would be considered within the spirit and scope of the present disclosure.

Mutex Processing Unit

Example 1

Figure 4:
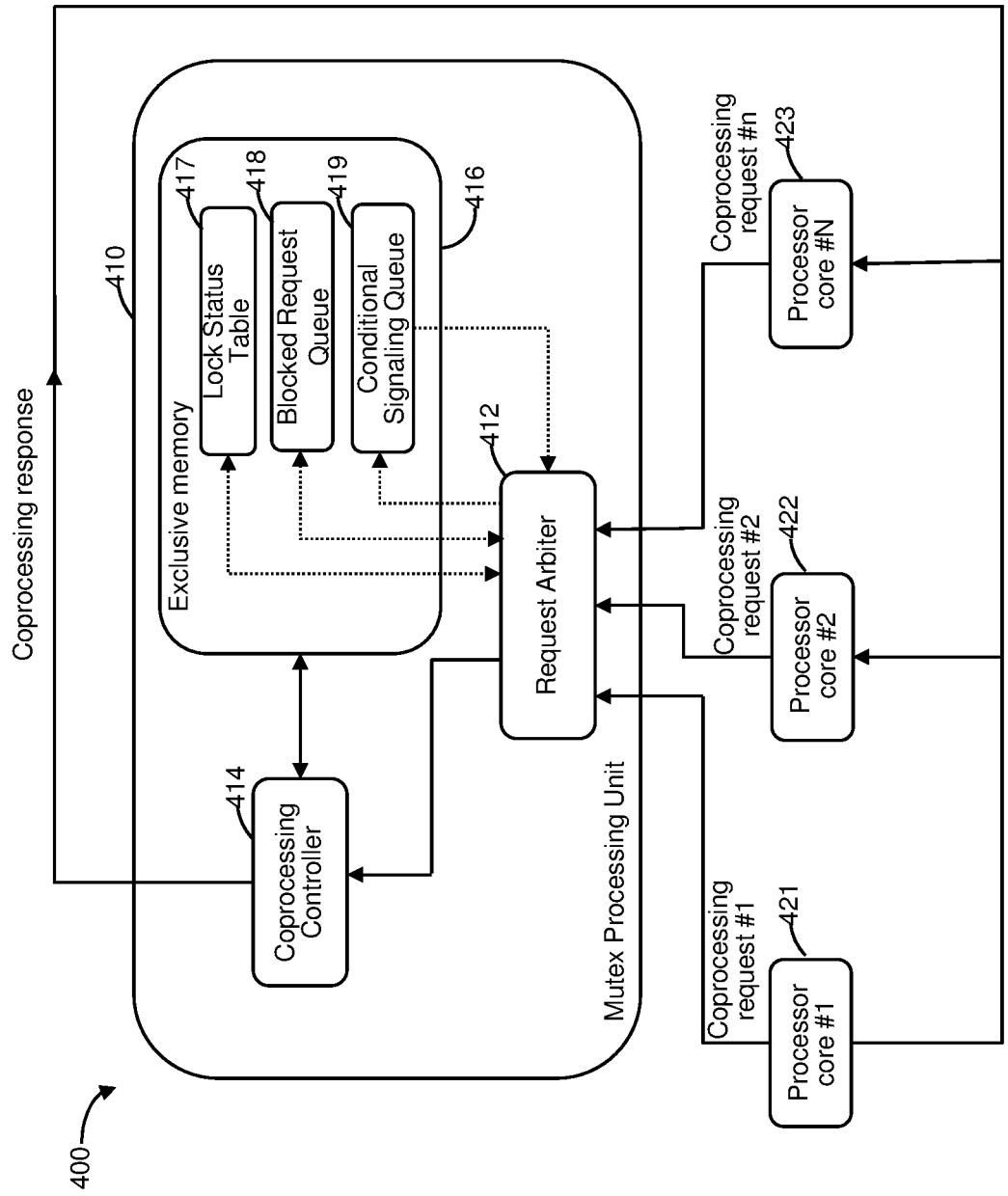
FIG. 4 shows a diagram of a mutex processing unit according to some embodiments of the present disclosure in more details.

FIG. 4 shows a diagram 400 of a mutex processing unit according to some embodiments of the present disclosure in more details. In these embodiments, the micro-thread architecture includes a dedicated thread coprocessor as the mutex processing unit 410 which can access an exclusive cache/ memory 416 to resolve mutex locking and conditional signaling in a centralized way, thus avoiding racing condition.

Most processors provide basic support of mutex lock using some kind of atomic instructions to read and write a lock, which is essentially a shared memory location. Since it is not guaranteed to acquire the lock, it requires a loop ("spin") to repeatedly try locking until the lock is available. Spinlocks are only efficient if threads are likely to be blocked only for a short time. If another thread holds the lock for a long time, it wastes the processing bandwidth for not doing useful work. The following is a simple implementation of spinlock based on an atomic x86 instruction xchg( ), which exchange memory value in an atomic step.

```
Void acquire (int *locked) {
    Reg=1;
    While(1) {
        If(xchg(locked, reg)==0) break; // an atomic instruction which involves bus
            // transaction with high overhead
    }
}
```

Since it is quite common to use spinlock in a multi-core system, the shared memory access involves bus transaction and coherence cache protocol, both of which may impact the overall performance due to high overhead. A more efficient solution is to switch to a different thread while waiting for the lock to be acquired so that a processor core can be freed to perform another useful task.

To this end, according to an embodiment of the present disclosure, the mutex processing unit contains a request arbiter 412, a coprocessing controller 414 and an exclusive memory 416 which stores at least the following data structures: a lock status table 417, at least one blocked request queue 418 and at least one conditional signaling queue 419.

The request arbiter 412 has N request ports connecting with N processor cores 421-423. It receives at most N mutex requests simultaneously but at most R of the requests can be processed in each cycle, where 1<=R<=N and R is a hardware parameter.

The coprocessing controller 414 inside the mutex coprocessing unit 414 can be implemented as a hard-wired logic block or as a processor core dedicated with thread coprocessing. The processing speed of a processor core is lower than the dedicated hardware block. However, the processing workload of mutex and conditional variable (CV) is not large. Moreover, the processing performance can be enhanced with some custom instruction set to expedite the coprocessing workload related to mutex and conditional variables, such as the queue operations. The processor core has the advantage of implementing more sophisticated operation by software. Moreover, when compared with hard-wired solution, the processor-based (such as RISC-based) coprocessor supports more mutex locks and conditional variables because the processor core can make use of the next-level cache if the internal cache is insufficient.

The coprocessing controller 414 can access the exclusive memory (or cache) 416 to store a lock-status table, at least one blocked request queue and at least one conditional signaling queue to support the pthread-like API like mutex_lock( ) and signal( ), etc. In a processor system without the mutex processing unit 410, these data structure may be distributed in the coherence caches of different processor cores. Therefore, the threading function can interfere the cache storage of other application threads due to the data exchange between caches when running the coherence protocol. The allocation of exclusive cache/memory can effectively get rid of the coherence overhead since it will not contaminate the local cache in each processor core. It is crucial to avoid unpredictable cache coherence overhead in order to minimize the worst-case latency of the real-time applications, especially when the number of cores increase. If exclusive cache is used in the mutex processing unit, it connects with the next-level memory for more storage capacity.

The lock status table 417 stores the status of each mutex lock with different arrays, namely locked[k], locked_core[k] and locked_thread[k] where k is the mutex lock ID. Locked [k] equal '1' denotes that lock k is not available and hence locked, and '0' otherwise. Locked core[k] and locked_thread [k] denote the processor core and the thread that have acquired the lock k respectively. The coprocessing controller 414 may read and write the lock-status table 417 when processing a mutex request. If a lock request is rejected, it will append the rejected request to one of the blocked request queues 418 to be processed later when the target lock is unlocked. Meanwhile, the coprocessing controller 414 puts a thread into one of conditional signaling queues 419 associated with a conditional variable c if it is waiting for another thread to send a signal that the condition associated with variable c is met.

In some embodiments, each mutex request or each request port consists of multiple signals, indicating one or more of following: a requesting core, a request type, a target lock, a requesting thread, a target core, a target thread and the conditional variable. One example request may have elements as follows: Core ID; Request type; Thread ID; Lock index; and CV index.

The request type can be one of the following possible values:
  NO_REQ: no request.
  THREAD_START_REQ: request to activate a thread, which sets the corresponding request bit to '1'.
  THREAD_KILL_REQ: request to terminate a thread, which sets the corresponding request bit to '0'.
  LOCK_REQ: request to lock a particular target lock.
  UNLOCK_REQ: request to unlock a particular target lock.
  CV_WAIT_REQ: request to wait for a conditional variable.
  CV_SIGNAL_REQ: request to send a signal to wake up any one of the pending threads associated with a conditional variable.
  CV_BROADCATS_REQ: request to broadcast signals to wake up all pending threads associated with a conditional variable.

In some embodiments, when issuing the lock request LOCK_REQ or conditional wait request CV_WAIT_REQ, the mutex bit corresponding to the requesting thread may be set to '0'. The mutex bit will resume to '1' when the processor core either acquires the lock or receives the conditional signal later. In other embodiments, the mutex bit corresponding to the requesting thread is set by the mutex processing unit by mutex responses.

A processor core can generate a message with a request code corresponding to one of the request types listed above so that the mutex processing unit can decode the message and process the request accordingly. For example, when requesting to lock a mutex, the request code of the processor core equals to LOCK_REQ. When requesting to unlock a mutex, the request code of the processor core equals to UNLOCK_REQ.

Multiple processor cores 421-423 may send requests to the mutex processing unit simultaneously. The request arbiter 412 uses an arbitration algorithm, such as the round robin algorithm, to serve the requests from different sources. In one embodiment, if the request arbiter 412 decides to receive a request from a requesting source, say c*, it sets the corresponding request ready flag, i.e. reqRdy[c*], to '1' and sets the request ready flags for other cores to '0', i.e. reqRdy[c]=0 for all c not equal to c*. After making a request, each requesting processor core must be stalled if reqRdy equals to '0'. Then the processing pipeline will stall and it can only fetch the next instruction to execute until reqRdy turns to '1'.

In other embodiments where a bus line is used for each processor core to send the mutex request and receive the mutex response, the request ready flag can be omitted and corresponding port or a mutex response indicating the processor core being served may function as the request ready flag.

Meanwhile, the coprocessor controller 414 broadcasts the arbitration results to every processor core. Each mutex response consists of multiple signals, including one or more of following: an identity (ID) of the processor core and an ID of the thread which receives the mutex grant. It also outputs one of the possible response type. One example response may have elements as follows: Core ID; Response type; Thread ID; Lock index; and CV index.

The response type can be one of the following possible values:
- THREAD_START: if the served request is THREAD_START_REQ, the mutex processing unit will check the request and send a THREAD_START response to the destined core.
- THREAD_KILL: if the served request is THREAD_KILL_REQ, the mutex processing unit will check the request and send a THREAD_KILL response to the destined core.
- LOCK_GRANT: if the served request is LOCK_REQ, and it is granted without detecting any error, the mutex processing unit returns a LOCK_GRANT message.
- MUTEX_READY: if the served request is CV_WAIT_REQ, the mutex bit is automatically set to '0' after requesting. When the corresponding request is granted, the mutex processing unit can notify each requesting processor core which mutex bit can be set to '1' so that the kernel trigger will activate the kernel thread to schedule the user thread if necessary.
- UNLOCK_GRANT/UNLOCK_ERROR: if the served request is an unlock request and it is granted without detecting any error, the mutex processing unit returns a UNLOCK_GRANT message. However, if the mutex processing unit finds that the requested thread is not the owner of the lock, it will set an UNLOCK_ERROR message so that the processor core can handle the error.

If the served request is LOCK_REQ, the coprocessor controller checks the locked bit of the target lock, i.e. locked[reqTarget], to determine if it is available or not. If the requested lock is available, i.e. locked[reqTarget]=0, the response to the selected request is LOCK_GRANT. The coprocessor controller updates the lock status table by setting locked[reqTarget]=1 and associates the requesting core, i.e. request_core, and requesting thread, i.e. request_thread, with the target lock, i.e. reqTarget, i.e. locked_core[reqTarget]=request_core and locked_thread[reqTarget]=request_thread. If the requested lock is not available, i.e. locked[reqTarget]=1, the coprocessor controller will not output any response for the request and the failed request is appended to a blocked request queue. Since the requesting core simultaneously set the corresponding mutex bit to '0' when executing the mutex request instructions, if the requesting core does not receive any response, it will become inactivated in the next cycle, which then make kernel trigger to invoke the kernel thread to schedule a new user thread. If the grant signal is UNLOCK_ERROR, the coprocessor controller may generate an exception so that some software will handle the error.

When receiving a MUTEX_READY response, the kernel trigger module in each processor core checks if the core index from the arbiter response matches its own core index. If matched, it will set the ta mutex bit to '1' accordingly, where t is the thread index received from the arbiter response. It should be noted that the thread index t in the response is not necessarily equal to the last requested thread since the response may correspond to an earlier request from one of the blocked request queues. If the grant signal indicates the requested lock is available, the $t^{th}$ mutex bit of the destined processor core is set to '1'.

The blocked request queue allows a processor core to control threads in a fire-and-forget manner. If a thread fails to acquire the target lock, the blocked request is put in the blocked request queue so that the mutex processing unit may acquire the target lock later when the target lock is unlocked. If using a single request queue, it may suffer from the head-of-line blocking problem. It is possible that the lock requested by the first request of the queue is NOT ready but one of the subsequent requests is ready. In order to avoid the head-of-line blocking problem, the mutex processing unit can allocate one blocked request queue for each target lock, i.e. a total of LOCK_NUM request queues, where LOCK_NUM is the number of locks available. If there is any failure to acquire a lock k, the request arbiter will append the blocked request for acquiring target lock k to reqQueue[k], such that 0<=k<LOCK_NUM. When the lock k is unlocked later, i.e. locked[k]=0, the mutex processing unit checks if the blocked request queue k is non-empty. If so, it can pop one request from the blocked request queue and extract the processor core index r* and the thread index t* stored in the popped request. Then the mutex processing unit sends the LOCK_GRANT message to the processor core r* and set the bit locked[t*] to '1'. Furthermore, it should also update the locked table such that locked_thread[k]=t* and locked_core[k]=r*.

When it comes to enabling conditional variables, in some embodiments of the present disclosure, Pthread API requires the programmer to associate a conditional variable c with a mutex m. Some threads may find that they are not ready to run yet because a certain condition is not satisfied while this condition depends on some shared data guarded by m. For example, in the classical producer-consumer example, a consumer thread has to wait for the condition that the queue is not empty while the empty condition depends on the shared counter which can be modified by both the producer and consumer thread. In order to avoid wasting processing bandwidth to do polling and wait for the condition to change, the stalled threads should instead declare that they are waiting for the signaling of the conditional variable c, release the mutex m, and then enter the sleep state. When another thread locks m to acquire exclusive access of the shared data, it can change the shared data, such as increasing the counter value, and determine whether the signaling condition is met. If so, it will generate a signal for c and wake up at least one thread waiting for c.

If a thread to of a processor core $R_0$ runs the Pthread-like conditional-wait function which depends on a conditional variable c, the processor core $R_0$ sends a CV_WAIT_REQ request to the mutex processing unit, which will then put the index of the requesting thread to in a condition-waiting queue associated with the conditional variable c. Meanwhile, in one embodiment, similar to the LOCK_REQ request, the processor core sending the CV_WAIT_REQ request automatically clears the mutex bit of the current thread to '0'. When another thread $t_1$ finds the condition associated with c is met, it sends or broadcast the signal for c. If $t_1$ only intends to wake one of the pending threads, it sends a CV_SIGNAL_REQ request. If $t_1$ intends to wake all pending threads, it sends CV_BROADCAST_REQ. The mutex processing unit will then fetch one or all thread indexes from the signaling queue associated with c and then send at least one MUTEX_READY response to set the mutex bits of at least one thread of at least one processor core.

Figure 5:
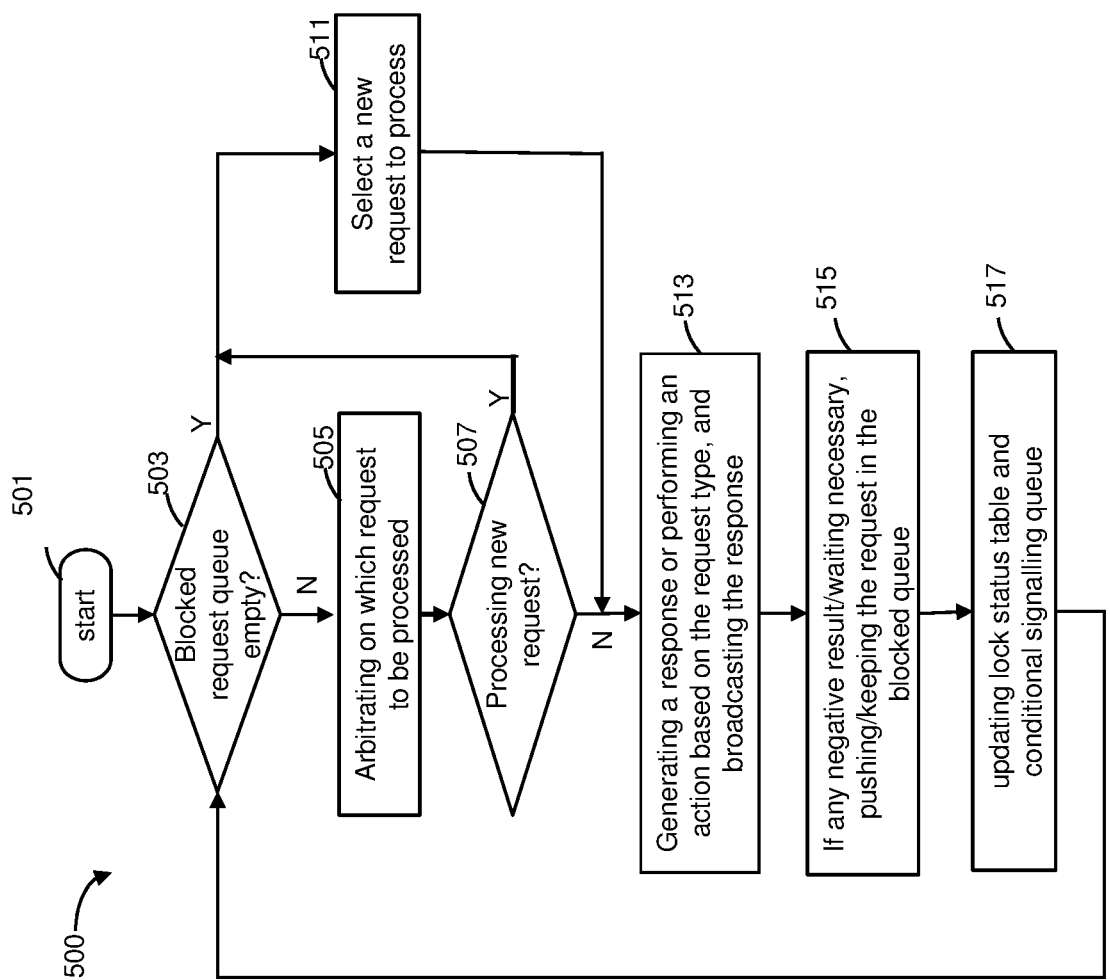
FIG. 5 shows a process of a mutex processing unit processing the mutex requests according to one embodiment of the present disclosure.

FIG. 5 shows a process 500 of the mutex processing unit processing the mutex requests according to one embodiment of the present disclosure. To simplify the description, here a single blocked request queue is assumedly used.

The process 500 starts at 501 where the mutex processing unit initiates processing of the mutex requests it received. At 503, the mutex processing unit checks if the blocked request queue is empty. If yes, at 511 it directly selects a newly received request to process according to arbitration policy for new requests. Otherwise at 505 the mutex processing unit arbitrates which request to be processed depending on different arbitration policies for both the existing requests and new requests.

In one exemplary embodiment, at 505, upon checking the information indicated in the first blocked request which requires a specific mutex lock, the mutex processing unit determines whether the target lock of the first blocked request is available by accessing the exclusive memory it contains. If the target lock is available, at 507 the outcome of the arbitration indicates to process the first blocked request. Then, the first blocked request is processed and popped from the blocked request queue. Accordingly at 513, a mutex response is generated to inform the requesting processor core setting a bit of the mutex register corresponding to the requesting thread in the requesting processor core to "1". Further, in some embodiments where the request ready flag is used, the request ready flag may be set to "0" for all other requesting cores. After the mutex request is processed, at 517, the information in the lock-status table and in the conditional signaling queues are updated accordingly.

If the target lock is not available, at 513 and 515, the mutex processing unit performs necessary actions and the first blocked request is kept in the blocked queue or pushed at the end of blocked request queue. On the other hand, if at 507 the outcome of the arbitration indicates to process a new request instead of those requests in the blocked request queue, the process 500 goes to block 511 to select a newly received request to process according to arbitration policy for new requests and then proceeds to block 513 to process the selected new request accordingly.

In one embodiment, if there is no blocked request to be served yet, one of the new requests is processed and reqRdy [c]=1 is set if the request from the core c is processed. If the target lock of the new request is available, a response of LOCK_GRANT is returned. If the target lock is not available, the new request is pushed into the blocked queue and no response is provided. If the new request has a type of request to unlock a lock and the new request matches a previous lock request, a response of UNLOCK_GRANT is returned. If the unlock request is invalid, a response of UNLOCK_ERROR is returned, and if there is no space in the blocked request queue, a response of QUEUE_ERROR is returned.

It would be appreciated that for different types of mutex requests, the mutex processing unit processes accordingly and generates different types of mutex responses. The above embodiments only illustrate some use cases as examples.

Figure 6:
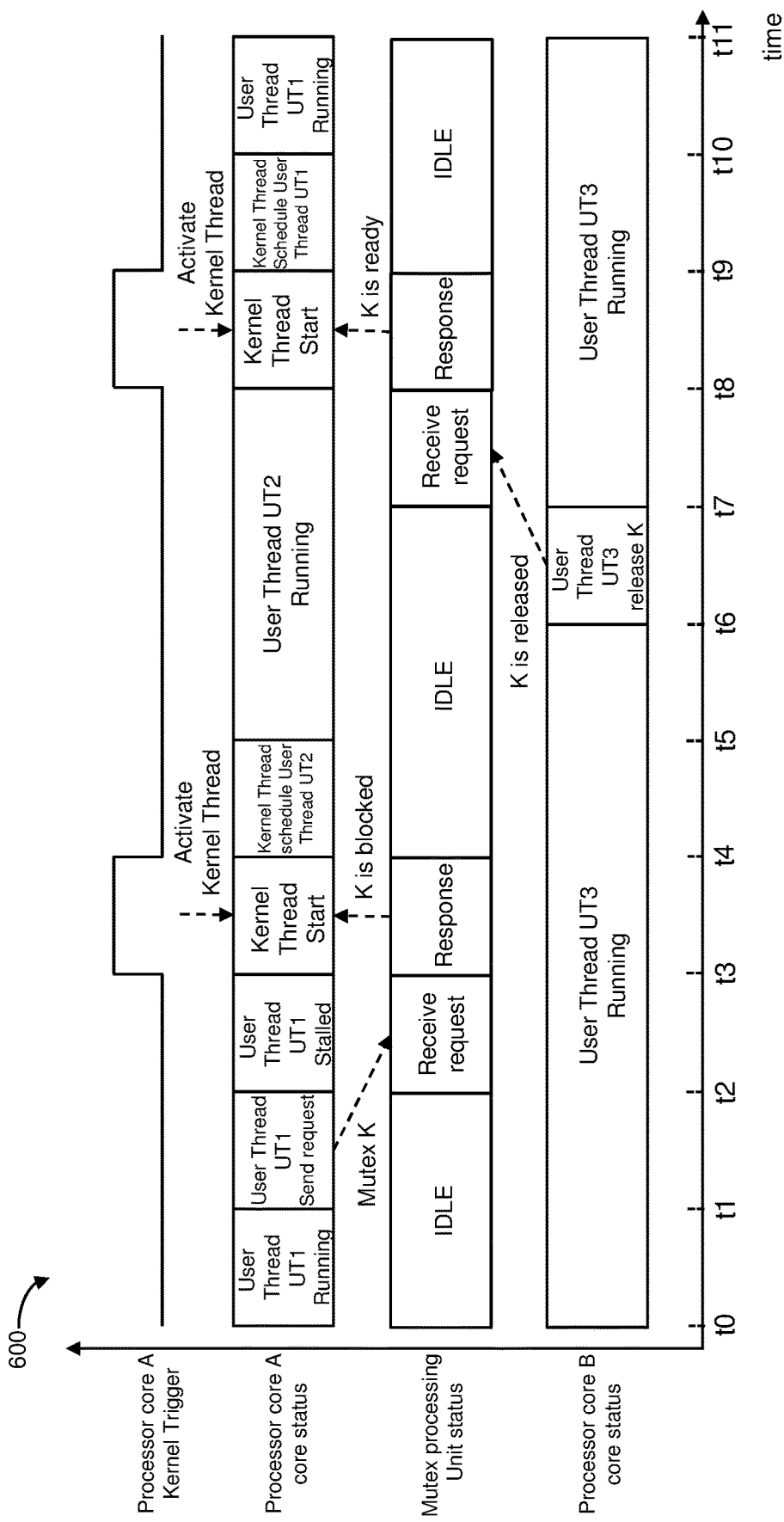
FIG. 6 illustrates a timing diagram a process at a mutex processing unit for a specific use case according to an embodiment of the present disclosure.

FIG. 6 illustrate a process 600 at the mutex processing unit for a specific use case according to an embodiment of the present disclosure. As shown, in this embodiment a processor system comprising two processor cores, i.e., processor A and processor B, and a mutex processing unit are discussed. In this diagram, the horizontal axis indicates clock cycles and the vertical axis indicates different actors in the process 600.

The process 600 starts where a first user thread in the processor core A (i.e., user thread UT1) is running and at the same time a user thread in processor B (i.e., user thread UT3) is running. At some point, the running UT1 requires a mutex K and processor A sends a mutex request LOCK_REQ which asks for acquiring the mutex K to the mutex processing unit. In the meantime, UT1 is stalled and processor A is await a response from the processing unit.

In one embodiment, once the LOCK_REQ is sent, if no LOCK_GRANT response is received in the next cycle or in the next few cycles, the mutex bit for UT1 in the kernel trigger module of processor A is automatically set to "0", which in turn fulfills one of the trigger conditions and will trigger to generate a kernel trigger indicator.

On the other hand, upon receiving the mutex request, the mutex processing unit resolves mutex dependency by accessing its exclusive memory and determines whether the mutex K is available. Suppose that mutex K was granted to UT3 of processor B and currently UT3 owns the critical resources governed by mutex K. In other words, in one embodiment, if for the LOCK_REQ the mutex K is not available, the mutex processing unit will not output any response for this LOCK_REQ and this LOCK_REQ will be appended to the blocked request queue in the exclusive memory.

Processor A detected at next cycle that the mutex K is not available and the kernel thread is activated by the kernel trigger indicator. The kernel thread of processor A performs priority-based scheduling to select the next user thread. Assuming that UT2 has lower priority than UT1, then UT2 starts running in the processor A.

Once UT3 of processor B finishes its actions with the mutex K, processor B sends an UNLOCK_REQ to the mutex processing unit to request a release of the mutex K. Upon receiving the UNLOCK_REQ, the mutex processing unit processes the previously blocked LOCK_REQ sent from the processor A, and generates a LOCK_GRANT response towards processor A and preferably an UNLOCK_GRANT response towards the processor B. The responses are broadcasted to all the processor cores.

Processor A is notified from the LOCK_GRANT response that the mutex K is available for UT1 to acquire and use. LOCK_GRANT response may directly modify the mutex bit for UT1 in the kernel trigger module of processor A from "0" to "1". The kernel trigger module in processor A monitors the thread registers and finds UT1 is ready to be scheduled due to its higher priority even though UT2 has not finished yet. A kernel trigger indicator is generated from bits of the thread registers for UT1. Accordingly, the kernel thread is activated and UT1 is scheduled to run in processor A.

It would be appreciated that FIG. 6 only illustrates an exemplary use case in a simple way. According to other embodiments of the present disclosure, the mutex processing unit handles all mutex related requests for all the processor cores in a centralized way to resolve mutex dependencies and maintain the conditional variable while meeting the atomicity constraints.

Example 2

Figure 7:
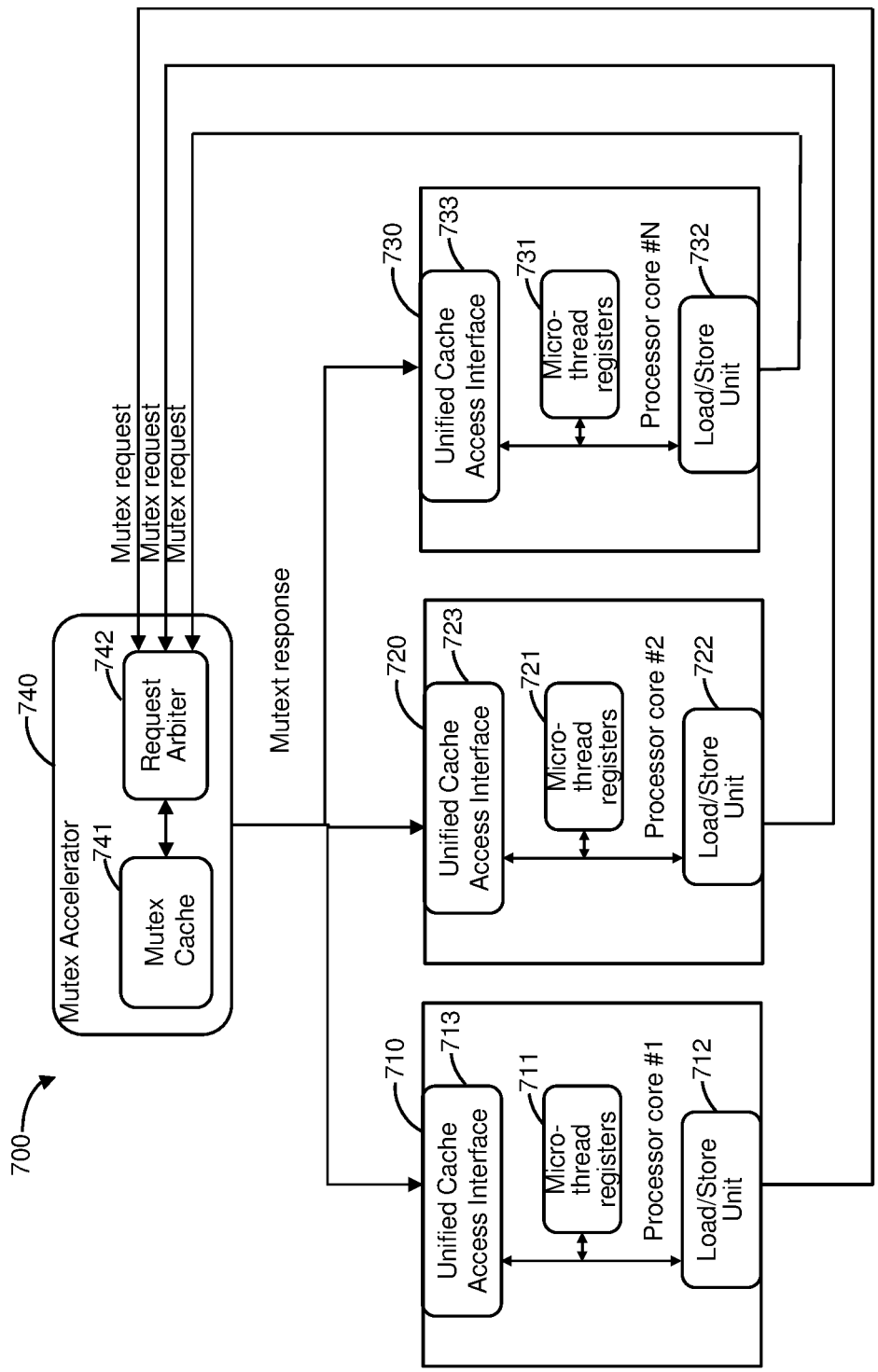
FIG. 7 shows a diagram of a mutex processing unit according to some other embodiments of the present disclosure.

FIG. 7 shows a diagram 700 of a mutex processing unit according to some other embodiments of the present disclosure. In these embodiments, the micro-thread architecture includes a mutex accelerator 740 as another implementation of a mutex processing unit and multiple processor cores indicated as 710, 720 and 730. The mutex accelerator 740 connects with N processor cores via N individual request interfaces and one response interface. Each of the processor cores 710, 720 and 730 can only gain access to the mutex accelerator 740 after the mutex accelerator 740 grants the access right upon request arbitration.

The mutex accelerator 740 is configured to reduce the logic resources dedicated for the mutex processing unit. Instead of running the thread management software in the mutex processing unit, in some embodiments, one processor core, either 710, 720 or 730, can be reused to run the coprocessing operations in its kernel thread.

In one embodiment, the mutex accelerator 740 allows only one of the processor cores to perform one of the following two functions:
(i) acquiring exclusive right of reading and writing a mutex cache 741 embedded in the mutex accelerator; and
(ii) writing the micro-thread registers of another processor core.

In this embodiment, each processor core has similar components as shown in FIG. 2 and FIG. 3. The processor cores 710, 720 and 730 each have micro-thread registers 711, 721 and 731 and load/store units 712, 722 and 732. The micro-thread registers may be the thread registers in the kernel trigger modules, including thread request registers, multi-priority registers and mutex registers. The load/store unit may be part of the execution unit 210.

One and only one of the plurality of processor cores is granted an exclusive request to acquire an exclusive access right to the mutex cache 741 at any given time. Once a processor core gains the exclusive access of the mutex cache, it can access either the local data cache or the mutex cache as if it is access one cache only. Additionally, in order to enable each processor core to access either the local data cache or shared mutex cache as a unified cache, each processor core may incorporate a unified cache access interface indicated as 713, 723 and 733. Details on the unified cache access interface will be discussed below in connection with FIG. 8.

In one embodiment, the mutex accelerator 740 comprises a mutex cache 741 which is shared by all the processor cores and a request arbiter 742. The mutex cache 741 stores all the data structure required for managing threads, including the acquiring/releasing a mutex lock, appending the blocked mutex request to the pending queues, waiting/signaling/broadcasting with a conditional variable etc. The embedded mutex cache 741 may have all the necessary and sufficient components of a data cache, including the hardware resources for cache-tag lookup, cache replacement policy, such as the LRU policy, and the interface to the next-level memory, which may be a Level 2 (L2) cache or an external Double Data Rate (DDR) chip. If requested data is not found in the mutex cache 741, the mutex accelerator 740 will refill the missed cache lines from the next-level memory.

The request arbiter 742 has at least one interface connecting with the at least one processor core and is configured to arbitrate on whether to process one or more of the plurality of mutex requests upon receiving them and generate at least one of the mutex responses based on a type of the processed mutex request.

In one exemplary embodiment, the type of mutex requests and the mutex responses may be as shown in table 1 and table 2 below.

TABLE 1

| Request Type | Parameters |
| --- | --- |
| Requesting exclusive right | n/a |
| Release exclusive right | n/a |
| Read mutex memory | Mutex cache address |
| Write mutex memory | Mutex cache address, write data |
| Write enable register bit | Core index, thread index, register value |
| Write priority register | Core index, thread index, priority index, register value |
| Write mutex register | Core index, thread index, register value |

TABLE 2

| Response Type | Parameters |
| --- | --- |
| Grant exclusive right | n/a |
| Return read data | Mutex read data |

Figure 8:
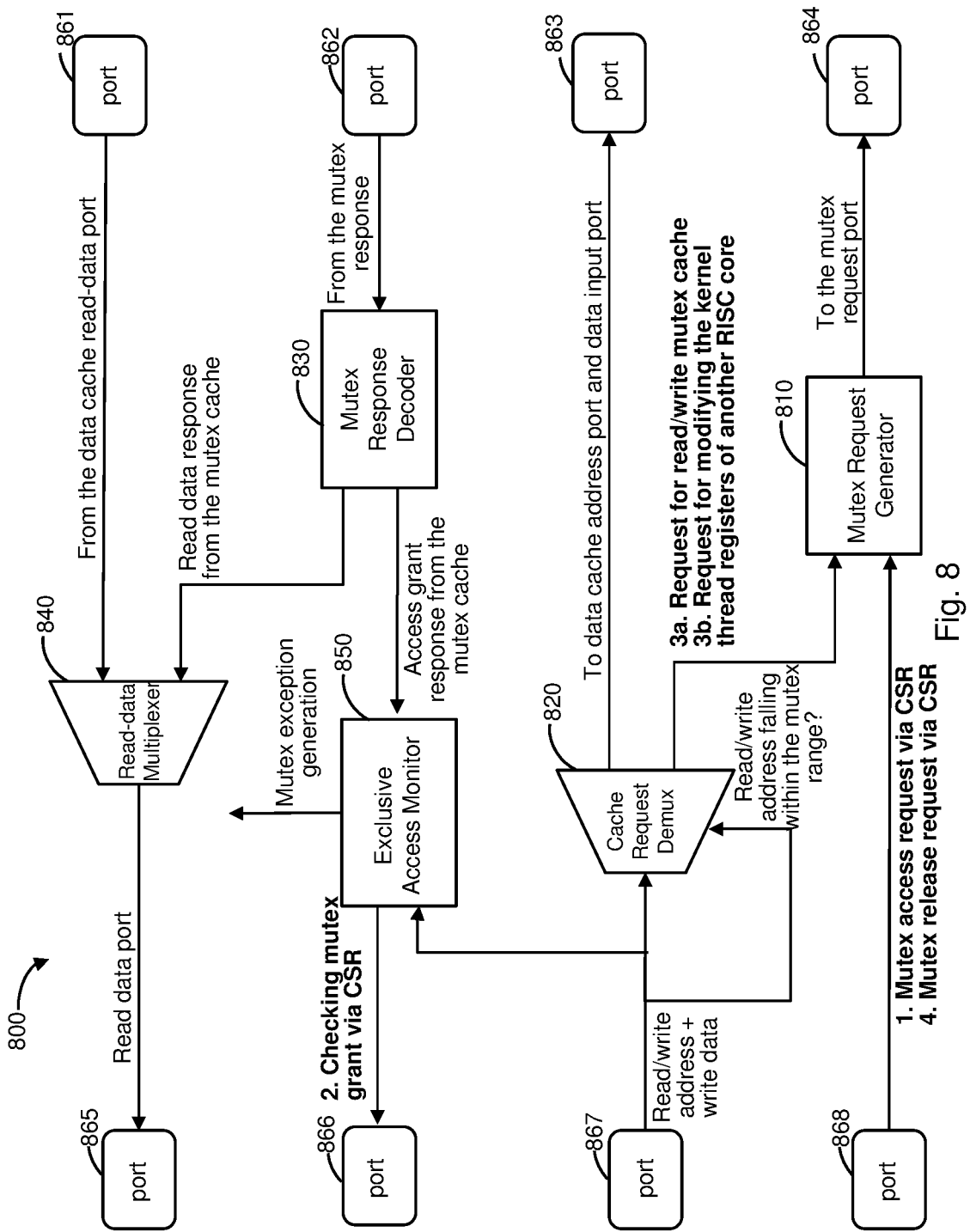
FIG. 8 is a diagram showing a unified cache access interface of a processor core according to some embodiments of the present disclosure.

FIG. 8 is a diagram 800 showing a unified cache access interface of a processor core according to some embodiments of the present disclosure. The unified interface contains a mutex request generator 810, a cache request demultiplexer 820, a mutex response decoder 830, a read-data multiplexer 840 and an exclusive access monitor 850. It also has multiple ports 861-868 to send or receive requests or response and to write or read data from the local data cache and shared mutex cache.

The mutex request generator 810 is configured to generate a request as shown in table 1 above. According to inputs from instructions executed by the processor core sent via port 868 and from the request demultiplexer 820, the mutex request generator 810 creates different types of mutex requests.

The cache request demultiplexer 820 is configured to forward a load/store request either to the local data cache or the mutex cache. The load/store request may include read/write address and write data. The request demultiplexer 820 checks if the read/write address range falls within the mutex range, and based on the checking result, it determines to forward the load/store request to the local data cache if the address is out of range or to the mutex cache otherwise. If the load/store request should be forwarded to the mutex cache, the request demultiplexer 820 sends the request to the mutex request generator 810 for further processing. In some embodiments, the load/store request indicates a request as shown in table 1 for modifying the micro-thread registers of another processor core. The request demultiplexer 820 also forwards this load/store request to the mutex request generator 810 for further processing.

The response decoder 830 is configured to determine whether the mutex response from the mutex accelerator is a read-data response associated with read-data or an exclusive access response for granting exclusive access. According to the mutex response type and parameters, the response decoder 830 updates the exclusive access monitor 850 if the response indicates a grant of exclusive right, and it forwards the read data to the read-data multiplexer 840 if the response is a read-data response.

The read-data multiplexer 840 is configured to select either the read data from the local data cache or the mutex cache to return to the processor core. This selection should be performed to ensure the data is returned in the same order as the request order.

The exclusive access monitor 850 is configured to monitor a state of an access grant which indicates whether the processor core has gained exclusive right for accessing the mutex accelerator. The state of the access grant may be stored in an access grant register in the exclusive access monitor 850 and it is updated by the mutex response decoder 830.

The following procedures, which is also indicated in FIG. 8, shows how a processor core accesses the mutex accelerator via the unified cache access interface.

At process 1, one or multiple processor cores execute an instruction to write to a Control and Status Register (CSR) to request a mutex_cache_access, which causes the mutex request generator 810 to send a request for exclusive access to the mutex accelerator. In one embodiment, the CSR is located inside the unified cache access interface. If the mutex cache is not acquired by any processor core, the mutex accelerator performs round robin arbitration to grant access to one of the contending processor cores sending such requests. Furthermore, the mutex accelerator sets its own status register to prevent granting access again to other processor cores. Meanwhile, the mutex accelerator sends a response to the mutex response decoder 830 of the granted processor core to instruct the exclusive access monitor 850 to set the access grant register to '1'. Meanwhile, it may also send a response to all requesting processor cores to inform which core gains the exclusive access.

Process 2 is required to ensure it has gained the exclusive access right before reading or writing the mutex cache. Before reading or writing the mutex cache, each requesting processor core executes an instruction to read a CSR on the mutex_cache_grant status, which reads the state of the exclusive access monitor 850. If the state of the access grant is '1', this implies the processor core has gained the exclusive access right and so it is ready to read/write mutex cache. Otherwise, it will stall until it gets the access right to the mutex accelerator.

At process 3 (i.e., 3*a* and 3*b*), the processor core uses standard load/store instructions to access either the local data cache or mutex cache in the mutex accelerator as if it accesses one cache only. If the request demultiplexer 820 determines that the load/store address does not fall within the mutex address range, it forwards read/write address and the write data to the address port and the write-data port 863 of the local data cache. On the other hand, if the address falls within the mutex range, the exclusive access monitor 850 checks its internal state to determine if the processor core has the exclusive access right. If not, it implies potential software problem. Therefore, the access grant monitor 850 may generate an exception signal to let the processor core to run an exception subroutine to handle the problem. If there is no exception, the request demultiplexer 820 forwards address and write data to the mutex request generator 810, which then outputs a read request or write request to the mutex request port 864 of the mutex accelerator. Meanwhile, the processor core may also send a request to modify the micro-thread registers, including thread request registers, multi-priority registers and mutex registers, in other processor cores via the mutex accelerator. The mutex request generator 810 receives such a request from the request demultiplexer 820 and generates a request accordingly. In general, a processor core granted the exclusive access right can access the mutex cache or thread request in arbitrary sequences.

At process 4, after the processor core has finished accessing the mutex cache and/or the micro-thread registers, it should release the access right as soon as possible so that other pending processor cores can acquire the exclusive access. The process core may send a mutex release request via CSR to the mutex request generator 810 and it generates a request accordingly.

Context Switching of the Multi-Page Register File

As mentioned in the processor core part, since the overhead of context switching is large, in some embodiments a multi-page register storage is integrated in each processor core, so that the processor core can switch context by changing the register page pointer if the requested register page is cached. In order to support register page flushing when switching context, the processor core supports an instruction to check whether the register associated with a thread is cached in one of the register pages. If the requested register page is not cached, it can still swap the contents of the LRU page with the memory contents.

Considering that the clock frequency decreases with the increasing numbers of register pages and the numbers of registers in each page, the number of register pages is constrained by the target operating frequency and the selected hardware platform (e.g., ASIC (Application Specific Integrated Circuit) or FPGA (Field Programmable Gate Array)). In order to minimize the overall register numbers, it is preferable to optimize the number of registers for each page according to the page usage. Since the kernel thread function is relatively simple when compared with user threads, a page with fewer registers is reserved for the kernel thread without performance loss. Furthermore, other register pages may be divided into one or more page groups according to the number of registers per page. Different threads are associated with different page groups.

To this end, in some embodiments, each processor core further comprises a context switching module and a multi-page register storage. The multi-page register storage comprises a plurality of register groups, each register group comprises a plurality of register pages, each register page comprises a plurality of registers; and the context switching module is configured to switch register context by changing the register page pointer if a requested page is cached, so that a context switching overhead can be reduced. Each user thread in the processor core is associated with one page of one of the plurality of storage groups.

Suppose the registers in different page groups are denoted as reg[g][p][r], where g denotes the page group, p refers to one of the pages in the page group g, and r refers to one of the registers in the page p. In one embodiment, all pages in the same group have the same number of registers per page.

Two control registers, denoted as curPage and curGroup, indicate the page and the current page group currently being accessed. Given an instruction accessing a register r, the physical register to be accessed is reg[curGroup][curPage][r].

In this embodiment, the processor core has a storage recording the thread index associated with each register page p and group g, denoted as page2Thread[g][p]. Additionally, it also has storage recording how recent is the pagep of group g being accessed, denoted as page2Recent[g][p]. Without loss of generality, it is assumed that the larger is the value of page2Recent, the least-recently the page is used.

Figure 9:
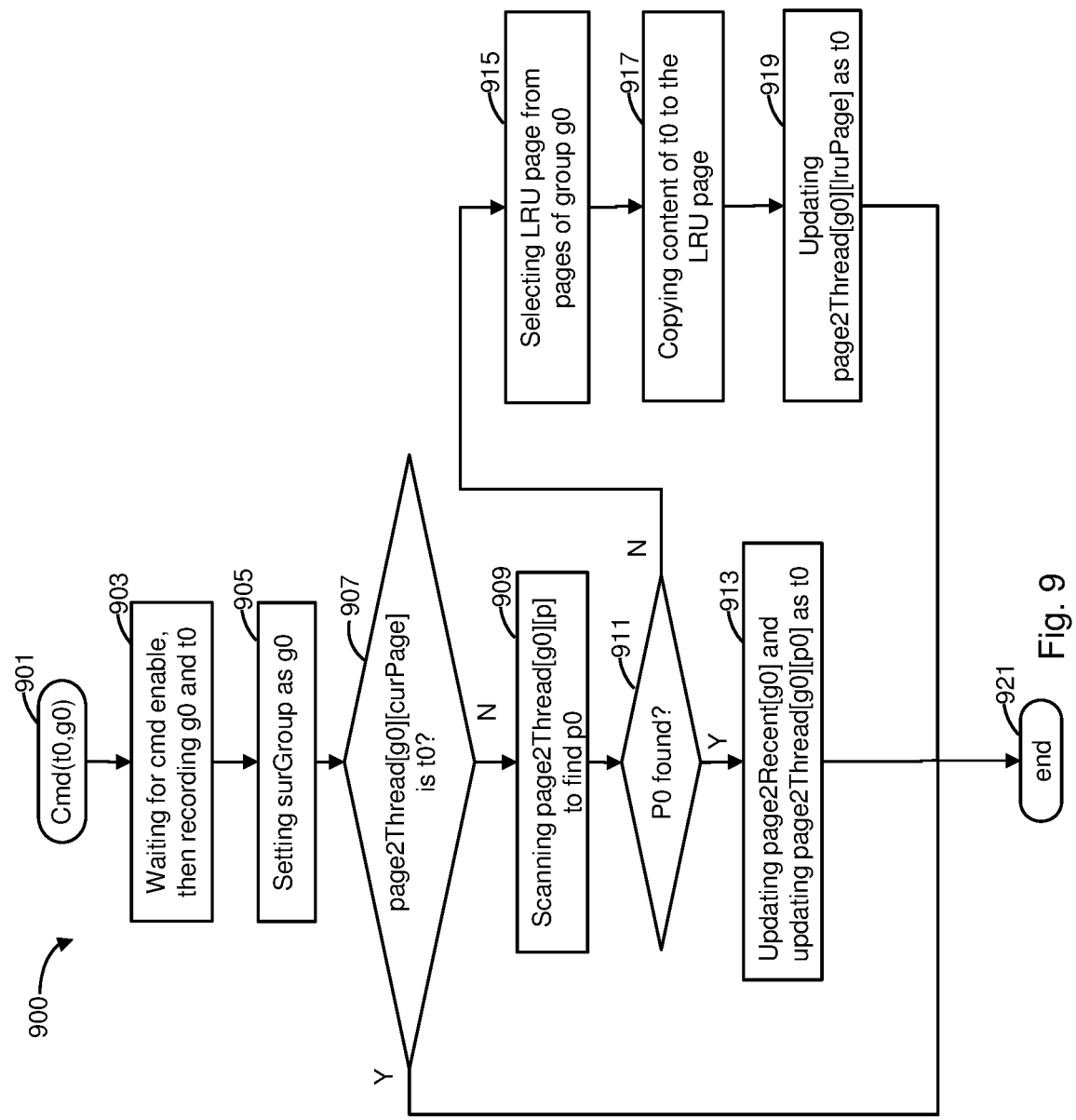
FIG. 9 shows an example process of context switching in a processor core according to some embodiments of the present disclosure.

FIG. 9 shows an example process 900 of context switching in a processor core according to some embodiments of the present disclosure. The process 900 can be performed by an execution unit of the processor core. Suppose at 901 the kernel thread schedules a new thread $t_0$ and $t_0$ is associated with a register group $g_0$. The process 900 starts at 901 where an instruction Cmd($t_0$, $g_0$) is issued and at 903 once the instruction Cmd($t_0$, $g_0$) is enabled, $g_0$ and $t_0$ are recorded.

At 905, curGroup is set as $g_0$. Then at 907 a condition of whether page2Thread[curGroup][curPage]=$t_0$ is examined. If it is true, there is nothing to change and the process 900 goes to 921 and ends.

If the condition examined at 907 does not meet, at 909 the execution unit first needs to check if $t_0$ is already cached in any register page by scanning page2Thread[$g_0$][p] to find a $p_0$ such that page2Thread[$g_0$][$p_0$]=$t_0$. At 911, this step is to determine if such $p_0$ is found. If it is found, there is no need to perform context switching for the register file. Accordingly, at 913, curPage is set as $p_0$ and the page2Thread and the page2Recent table is updated for $g_0$ and $p_0$, so that page2Thread[$g_0$][$p_0$]=$t_0$ and page2Recent[$g_0$][$p_0$]=0

If at 911 such $p_0$ is not found, the execution unit at 915 selects the LRU register page, denoted as lru_page from one of the pages associated the group $g_0$, such that page2Recent[$g_0$][lru_page]>=page2Recent[$g_0$][p] for all p not equal to lru_page.

At 917, the existing register contents in the LRU page, i.e. page2Thread[$g_0$][lru_page], is flushed to memory regions allocated for it. Afterwards, the register content of $t_0$ is retrieved from the memory and copied to the LRU page. Then at 919, page2Thread[$g_0$][lru_page] is updated as to.

The provided multi-core architecture and thread scheduling methods according to the above example embodiments significantly reduce thread scheduling overhead and accelerate thread operations. As a result, this greatly benefits various real-time applications. Meanwhile the scalability of scheduling a considerable amount of threads in multiple processor cores is greatly improved.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

Methods discussed within different figures can be added to or exchanged with methods in other figures. Further, specific numerical data values (such as specific quantities, numbers, categories, etc.) or other specific information should be interpreted as illustrative for discussing example embodiments. Such specific information is not provided to limit example embodiment.

What is claimed is:

1. A processor system comprising:
   a plurality of processor cores, each of the plurality of processor cores providing a kernel thread and a plurality of user threads for concurrent execution and comprising a kernel trigger module configured to monitor a set of trigger conditions and generate a kernel triggering indicator to activate the kernel thread in the plurality of processor cores based on the set of trigger conditions; and
   a mutex processing unit connected with the plurality of processor cores and configured to receive a plurality of mutex requests from the plurality of processor cores, resolve mutex dependencies, and broadcast a plurality of mutex responses to the plurality of processor cores;
   wherein each of the plurality of mutex requests is configured to create a mutex response that affects an execution status of at least one user thread in the plurality of processor cores, so as to improve thread scheduling efficiency when a processor execution switches from one user thread to another.

2. The processor system according to claim 1, wherein the kernel thread of an individual processor core in the plurality of processor cores is configured to, after being activated by the kernel triggering indicator, schedule a next user thread in the individual processor core based on (1) priorities of user threads in the individual processor core, (2) the execution status of at least one user thread in the individual processor core and (3) the plurality of mutex responses generated by the mutex processing unit.

3. The processor system according to claim 1, wherein the trigger conditions comprise one of the following conditions:
   a time period allocated to a currently running user thread expires;
   a user thread having higher priority than the currently running user thread appears; and
   the currently running user thread becomes inactivated.

4. The processor system according to claim 1, wherein the mutex processing unit comprises:
   a request arbiter having a plurality of interfaces connecting with the plurality of processor cores and configured to receive the plurality of mutex requests from the plurality of processor cores and determine which mutex requests to process;
   an exclusive memory for storing data required for acquiring or releasing mutex locks, and waiting, signaling and broadcasting of conditional variables; and
   a coprocessor controller configured to coordinate with the request arbiter to process the plurality of mutex requests by accessing the exclusive memory and resolving mutex dependencies and to generate the plurality of mutex responses based on request types of the plurality of mutex requests, wherein the coprocessor controller can either be a dedicated hardware module or a processor core with customized instructions which expedite mutex coprocessing.

5. The processor system according to claim 4, wherein the exclusive memory comprises:
   a lock-status table including a first array storing information indicating a lock status of each mutex lock, a second array storing an identity of the plurality of processor cores requesting a mutex lock and a third array storing an identity of a user thread requesting a mutex lock, wherein elements in the first array, the second array and the third array are associated with an index of each mutex lock;
   at least one blocked request queue per mutex queueing those of the plurality of mutex requests that are blocked; and
   multiple conditional signaling queues, each being associated with a respective conditional variable and storing an identity of at least one user thread waiting for a condition associated with the respective conditional variable to be met.

6. The processor system according to claim 1, wherein each of the plurality of mutex requests comprises at least one of the following:
   an identity of a requesting processor core,
   an identity of a destined processor core,
   a requesting type,
   an identity of a requesting thread,
   an index of a target mutex lock, and
   an index of a conditional variable that the requesting thread requires.

7. The processor system according to claim 6, wherein the plurality of mutex requests comprise conditional variable related requests for processing a conditional variable which is located in a shared data area guarded by a mutex lock, the conditional variable related requests comprising one of the following requesting types:
   a request to wait for a signaling of said conditional variable;
   a request to wake up a specific user thread associated with said conditional variable in a particular processor core; and
   a request to broadcast to all processor cores to wake up those threads that are waiting for said conditional variable.

8. The processor system according to claim 6, wherein the plurality of mutex requests comprise one of the following requesting types:
   a request to activate a particular thread;
   a request to terminate a particular thread;
   a request for a target lock to be locked; and
   a request for a target lock to be unlocked.

9. The processor system according to claim 1, wherein each of the plurality of mutex responses comprises at least one of the following:
   an identity of a requesting processor core,
   a response type,
   an identity of a requesting thread; and
   an indication of a processor core being served by the mutex processing unit;
   wherein the response type includes information indicating any of the following:
   a particular thread to be activated;
   a particular thread to be terminated;
   a conditional variable is ready to access;
   a request for acquiring a target lock is granted;
   a request for unlocking a target lock is granted;
   a request for a target lock to be unlocked is invalid; and
   an exception error.

10. The processor system according to claim 9, wherein some of the plurality of mutex responses comprise signals to wake up any one of pending threads associated with a particular conditional variable, or a signal to wake up all the pending threads associated with the particular conditional variable.

11. The processor system according to claim 1, wherein the mutex processing unit comprises:
   a mutex cache for storing data required for acquiring or releasing mutex locks, and waiting, signaling and broadcasting of conditional variables; and
   a request arbiter having a plurality of interfaces connecting with the plurality of processor cores and configured to arbitrate on whether to process one or more of the plurality of mutex requests upon receiving them and generate at least one of the mutex responses obtained from a mutex request generator;
   wherein one and only one thread running in one processor core is granted an exclusive right to access the mutex cache at any given time.

12. The processor system according to claim 1, wherein each of the plurality of processor cores further comprises a context switching module and a multi-page register storage, wherein:
   the multi-page register storage comprises a plurality of register groups, each register group comprises a plurality of register pages, and each register page comprises a plurality of registers; and
   the context switching module is configured to switch register context by changing a register page pointer if a requested page is cached, so that a context switching overhead can be reduced;
   wherein each user thread in the plurality of processor cores is associated with only one page of one of the plurality of register groups at any given time;
   and wherein the plurality of processor cores further comprises a first control register for indicating which register page is currently being accessed, a second control register for indicating which register group is currently being accessed, and a storage array recording each thread index associated with a register page and a register group.

13. The processor system according to claim 1, wherein special executable instructions are provided to the plurality of processor cores for thread control, including instructions to enable or disable a new user thread in any processor core, to define a thread priority for a user thread in any processor core, to request a mutex lock and to control conditional variables.

* * * * *